(12) United States Patent
Sasaki et al.

(10) Patent No.: US 8,514,351 B2
(45) Date of Patent: Aug. 20, 2013

(54) LIQUID CRYSTAL DISPLAY

(75) Inventors: Hiroshi Sasaki, Mito (JP); Makiko Sugibayashi, Hitachi (JP); Yuka Utsumi, Hitachi (JP); Yasushi Tomioka, Hitachinaka (JP); Katsumi Kondo, Mito (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 431 days.

(21) Appl. No.: 12/791,920

(22) Filed: Jun. 2, 2010

(65) Prior Publication Data

US 2010/0238377 A1 Sep. 23, 2010

Related U.S. Application Data

(62) Division of application No. 11/477,640, filed on Jun. 30, 2006.

(30) Foreign Application Priority Data

Jul. 1, 2005 (JP) ................................. 2005-193296
May 17, 2006 (JP) ................................. 2006-137216

(51) Int. Cl.
*G02F 1/1335* (2006.01)

(52) U.S. Cl.
USPC ............................. 349/96; 349/112; 349/137

(58) Field of Classification Search
USPC ........................................... 349/96, 112, 137
See application file for complete search history.

(56) References Cited

U.S. PATENT DOCUMENTS

| | | |
|---|---|---|
| 6,181,394 B1 | 1/2001 | Sanelle et al. |
| 6,456,346 B1 | 9/2002 | Arai |
| 6,950,236 B2 | 9/2005 | Hokazono et al. |
| 7,208,206 B2 | 4/2007 | Hieda et al. |
| 7,209,196 B2 | 4/2007 | Saiki et al. |

(Continued)

FOREIGN PATENT DOCUMENTS

| | | |
|---|---|---|
| CN | 1263354 A | 8/2000 |
| CN | 1538223 A | 10/2004 |

(Continued)

OTHER PUBLICATIONS

Office Action in JP 2006-137216, dated Jul. 31, 2012 (in Japanese, 2 pgs.), [partial English language Translation, 1 pg.].

(Continued)

*Primary Examiner* — Rhonda Peace
(74) *Attorney, Agent, or Firm* — Antonelli, Terry, Stout & Kraus, LLP.

(57) ABSTRACT

Manufacture of a liquid crystal display is disclosed. The liquid crystal display includes a backlight unit, a backlight unit-side polarizing plate, and a liquid crystal cell held by two glass plates, the liquid crystal cell having an electrode, a liquid crystal layer, an alignment layer, and a color filter arranged between the glass plates. The liquid crystal display also includes a transparent front plate arranged at a side of the liquid crystal cell opposite to the backlight unit, a polarizing plate attached to the liquid crystal cell, and a transparent organic medium layer arranged between the front plate and the liquid crystal cell. Since the front plate is provided at the outermost surface of an image display portion, and the transparent organic medium is filled between the front plate and the liquid crystal module, it is possible to achieve an improvement in wear resistance and a reduction in reflectance.

4 Claims, 15 Drawing Sheets

(56) References Cited

U.S. PATENT DOCUMENTS

| | | |
|---|---|---|
| 7,285,323 B2 | 10/2007 | Sone et al. |
| 7,604,866 B2 | 10/2009 | Ohashi et al. |
| 2002/0063819 A1 | 5/2002 | Yano et al. |
| 2005/0068476 A1 | 3/2005 | Okabe |
| 2006/0102205 A1 | 5/2006 | Wang et al. |

FOREIGN PATENT DOCUMENTS

| | | |
|---|---|---|
| JP | 03-204616 | 9/1991 |
| JP | 06-075701 | 3/1994 |
| JP | 09-101518 | 4/1997 |
| JP | 09-133912 | 5/1997 |
| JP | 09-244005 | 9/1997 |
| JP | 2000-284102 | 10/2000 |
| JP | 2001-255403 | 9/2001 |
| JP | 2002-311204 A | 10/2002 |
| JP | 2004-252178 | 9/2004 |
| JP | 2004-258267 | 9/2004 |
| JP | 2005-010768 | 1/2005 |
| JP | 2005-049698 | 2/2005 |
| JP | 2005-249982 | 9/2005 |
| JP | 2005-251488 | 9/2005 |
| JP | 2005-302336 | 10/2005 |
| WO | WO 2004/113966 A1 | 6/2004 |

OTHER PUBLICATIONS

Office Action in JP 2006-137216, dated Oct. 4, 2011 (in Japanese, 2 pgs.), [partial English language Translation, 1 pg.].

Office Action in JP 2006-137216, dated Jan. 22, 2013 (in Japanese, 3 pages), [partial English language Translation, 2 pages].

HEATED STATE

100nm

PORTION WITH PORE  PORTION WITHOUT PORE

LIQUID CRYSTAL DISPLAY

CLAIM OF PRIORITY

This application is a divisional application of U.S. application Ser. No. 11/477,640, filed Jun. 30, 2006, and which application claims priority from Japanese Application JP 2005-193296 filed on Jul. 1, 2005 and JP 2006-137216 filed on May 17, 2006, the content of which is hereby incorporated by reference into this application.

FIELD OF THE INVENTION

The present invention relates to a liquid crystal display, and more particularly to a liquid crystal display having a transparent front plate arranged at an image display surface of the liquid crystal display.

BACKGROUND OF THE INVENTION

In an image display device using liquid crystals, light from a light source is recognized as an image as the light passes through a liquid crystal layer, a color filter, a polarizing plate, etc. In this case, the outermost surface of the image display device is the polarizing plate when the image display device is used as a personal computer monitor or as a liquid crystal television. In order to suppress surface reflection, an anti-glaring membrane having small-size irregularities or an anti-reflecting membrane is formed over a surface of the polarizing plate. The polarizing plate is a thin film made of tri-acetyl cellulose. This film has a pencil hardness of about 2 to 3H.

Taking into the consideration the fact that, in the case of a liquid crystal display used in a cellular phone, the liquid crystal display continuously come into contact with a garment in a state of being put into a pocket of the garment, a transparent resin plate made of acrylic resin or the like is provided on the polarizing plate, so that the liquid crystal display has an image display surface prevented from coming into direct contact with clothes, etc.

As mentioned above, the polarizing plate, which becomes the outermost surface of the image display device when the image display device is used as a personal computer monitor or as a liquid crystal television, is constituted by a thin film made of tri-acetyl cellulose while having a pencil hardness of about 2 to 3H. However, this film must have reduced wear resistance in order to form irregularities on the surface thereof in accordance with an anti-glaring process. For this reason, when the surface of the film is wiped using a duster or the like at home, in order to remove contaminants on the film surface, scratches are formed on the film surface if foreign matter of high hardness such as sand or soil has been attached to the duster. That is, where the outermost surface is provided by the polarizing plate, there is a problem of low wear resistance.

Furthermore, there is a possibility that an object may be struck against the surface of the personal computer monitor or liquid crystal television, even when the personal computer monitor or liquid crystal television is disposed indoors. In addition, when a bowl, vase, or toy is struck against a glass plate arranged beneath the polarizing plate, the glass plate may be broken if the impact generated due to the striking is excessive. This is because the glass plate has a thickness of about 0.5 to 0.7 mm, even though the thickness depends on the product. In this connection, both personal computer monitor and liquid crystal televisions have a tendency of an increased screen size. However, when the product has an increased screen size while maintaining the thickness of the glass plate, it may be easily broken even by very small impact because of a reduction in impact resistance.

In the case of a cellular phone, the transparent resin plate of the outermost surface thereof has a thickness of about 2 mm and is planar. Accordingly, even in a state in which the cellular phone is put into a pocket of a jacket, scratches causing a degradation in visibility are difficult to be formed on the outermost surface. In this case, however, since a gap is present between the transparent resin plate and the polarizing plate, strong reflection of ambient objects to the image display surface occurs due to light reflection at the opposite surfaces of the transparent resin plate. For this reason, there is a problem of a degradation in visibility at a bright place.

In addition, two glass sheets, which are used to seal liquid crystals therebetween in the manufacture of a liquid crystal panel, have a small thickness of 0.5 to 0.7 mm. For this reason, the glass sheets may be broken when they are held using a force higher than a required force during transportation or wiring procedures in each manufacturing process. Therefore, precision is required in the holding operation carried out during the manufacture of the liquid crystal panel.

SUMMARY OF THE INVENTION

The present invention has been made in view of the above-mentioned problems.

After reviewing various materials and plate configurations, the inventors found the facts that it is possible to achieve an improvement in wear resistance by providing a transparent plate at the outermost surface, and to reduce reflection of ambient objects by filling a transparent organic medium in an air layer defined in between the polarizing plate and the transparent plate, and thus, plugging the air layer. The present invention has been made on the basis of these facts.

The inventors also found the fact that, even when the front plate is made of organic resin, such as an acrylic plate, it is possible to achieve an improvement in wear resistance by providing an anti-reflecting membrane made of a material containing a silicon oxide of high hardness as the major component thereof. The present invention has been made on the basis of this fact.

The inventors also found that, when a polarizing plate is attached to the front plate, an effect capable of adjusting the absorption axis of the polarizing plate can be obtained through a fine adjustment of the position of the front plate. The present invention has been made on the basis of this fact.

In addition, the inventors found that, since an anti-reflecting membrane made of silicon oxide exhibits a low liquid contact angle, namely, a high hydrophilicity, thereby improving the adherence of the polarizing plate, as compared to a transparent base plate, it is possible to reduce generation of bubbles during the filling of the transparent organic medium. The present invention has been made on the basis of this fact.

By virtue of the provision of the front plate, it is difficult to damage the panel itself even when it is more or less firmly held during transfer thereof. Accordingly, it is unnecessary to increase the accuracy of the holding force of a holding system in the manufacturing apparatus.

The present invention provides the following aspects to achieve the above aspects.

The first aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit; a polarizing plate attached to the liquid crystal cell; and a transparent organic medium layer arranged between the front plate and the liquid crystal cell.

The second aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit; a transparent organic medium layer arranged between the front plate and the liquid crystal cell; and a polarizing plate attached to the front plate at a side of the transparent organic medium layer.

The third aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit; a polarizing plate attached to the liquid crystal cell; a transparent organic medium layer arranged between the front plate and the liquid crystal cell; and an anti-reflecting membrane arranged at a side of the front plate opposite to the transparent organic medium layer.

The fourth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit; a transparent organic medium layer arranged between the front plate and the liquid crystal cell; a polarizing plate attached to the front plate at a side of the transparent organic medium layer; and an anti-reflecting membrane arranged at a side of the front plate opposite to the transparent organic medium layer.

The fifth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane at each of opposite surfaces of the transparent front plate; a polarizing plate attached to the liquid crystal cell; and a transparent organic medium layer arranged between the front plate and the liquid crystal cell.

The sixth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane at each of opposite surfaces of the transparent front plate; a transparent organic medium layer arranged between the front plate and the liquid crystal cell; and a polarizing plate attached to the front plate at a side of the transparent organic medium layer.

The seventh aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a polarizing plate attached to the liquid crystal cell; and a transparent organic medium layer arranged between the front plate and the liquid crystal cell, wherein the backlight unit, the liquid crystal cell, and the polarizing plate are held by a frame, wherein the front plate is attached to the polarizing plate such that the transparent organic medium layer is interposed between the front plate and the polarizing plate.

The eighth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a polarizing plate attached to the liquid crystal cell; and a transparent organic medium layer arranged between the front plate and the liquid crystal cell, wherein the backlight unit, the liquid crystal cell, the polarizing plate, the transparent organic medium layer, and the front plate are held by a frame.

The ninth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a transparent organic medium layer arranged between the front plate and the liquid crystal cell; and a polarizing plate attached to the front plate at a side of the transparent organic medium layer, wherein the backlight unit and the liquid crystal cell are held by a frame, wherein the polarizing plate-side surface of the front plate is attached to the liquid crystal cell such that the transparent organic medium layer is interposed between the polarizing plate-side surface and the liquid crystal cell.

The tenth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a transparent organic medium layer arranged between the front plate and the liquid crystal cell; and a polarizing plate attached to the front plate at a side of the transparent organic medium layer, wherein the backlight unit, the liquid crystal cell, the transparent organic medium layer, the polarizing plate, and the front plate are held by a frame.

The eleventh aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a polarizing plate attached to the liquid crystal cell; and a transparent organic medium layer arranged between the front plate and the liquid crystal cell, wherein the backlight unit, the liquid crystal cell, and the polarizing plate are held by a frame, wherein the front plate is attached to the polarizing plate such that the transparent organic medium layer is interposed between the front plate and the polarizing plate, wherein the frame and the front plate are fixed to each other.

The twelfth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a transparent organic medium layer arranged between the front plate and the liquid crystal cell, a polarizing plate attached to the front plate at a side of the transparent organic medium layer, wherein the backlight unit, the liquid crystal cell, and the backlight unit-side polarizing plate are held by a frame, wherein the polarizing plate-side surface of the front plate is attached to the liquid crystal cell such that the transparent organic medium layer is interposed between the polarizing plate-side surface and the liquid crystal cell, wherein the frame and the front plate are fixed to each other.

The thirteenth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a polarizing plate attached to the liquid crystal cell; and a transparent organic medium layer arranged between the front plate and the liquid crystal cell, wherein the backlight unit is held by a frame, wherein the liquid crystal cell and the polarizing plate are held by the transparent organic medium layer, wherein the front plate is attached to the polarizing plate such that the transparent organic medium layer is interposed between the front plate and the polarizing plate, the frame and the front plate are fixed to each other.

The fourteenth aspect is a liquid crystal display comprising a backlight unit, a backlight unit-side polarizing plate, and a liquid crystal cell held by two glass plates, the liquid crystal cell having an electrode, a liquid crystal layer, an alignment layer, and a color filter arranged between the glass plates, further comprising: a transparent front plate arranged at a side of the liquid crystal cell opposite to the backlight unit, the transparent front plate having an anti-reflecting membrane; a transparent organic medium layer arranged between the front plate and the liquid crystal cell; and a polarizing plate attached to the front plate at a side of the transparent organic medium layer, wherein the backlight unit is held by a frame, wherein the liquid crystal cell and the backlight unit-side polarizing plate are held by the transparent organic medium layer, wherein the polarizing plate-side surface of the front plate is attached to the liquid crystal cell such that the transparent organic medium layer is interposed between the polarizing plate-side surface and the liquid crystal cell, wherein the frame and the front plate are fixed to each other.

The fifteenth aspect is the liquid crystal display according to any one of the first through fourteenth aspects, wherein a driver for the liquid crystal cell is arranged beneath the liquid crystal cell.

The sixteenth aspect is the liquid crystal display according to any one of the first through fifteenth aspects, wherein the front plate has an arithmetic average roughness (Ra) of 10 nm or less.

The seventeenth aspect is the liquid crystal display according to any one of the first through sixteenth aspects, wherein the transparent organic medium layer has a thickness of 0.1 to 10 mm.

The eighteenth aspect is the liquid crystal display according to any one of the first through seventeenth aspects, wherein the transparent organic medium layer and the front plate have a refractive index relation satisfying the following equation:

$$n_0-0.2<n<n_0+0.2$$

wherein, "n" represents a refractive index of a member constituting the transparent organic medium layer, and "$n_0$" represents a refractive index of the front plate.

The nineteenth aspect is the liquid crystal display according to any one of the first through eighteenth aspects, wherein the transparent organic medium layer contains a compound capable of absorbing light in a visible range.

The twentieth aspect is the liquid crystal display according to any one of the first through nineteenth aspects, wherein the compound capable of absorbing light in a visible range is a compound having a uniaxial anisotropy.

The twenty-first aspect is the liquid crystal display according to any one of the third through twentieth aspects, wherein the anti-reflecting membrane is made of silicon oxide particles and a binder, and the anti-reflecting membrane has pores formed in the anti-reflecting membrane.

The twenty-second aspect is the liquid crystal display according to any one of the third through twenty-first aspects, wherein the anti-reflecting membrane is made of silicon oxide particles and a silicon compound having a hydrolysable residue, and the anti-reflecting membrane has pores formed in the anti-reflecting membrane.

The twenty-third aspect is the liquid crystal display according to any one of the third through twenty-second aspects, wherein the anti-reflecting membrane is made of a compound having a perfluoropolyether chain, a perfluoroalkyl chain, or a fluoroalkyl chain at a surface of the compound.

The twenty-fourth aspect is a method for manufacturing a liquid crystal display including a backlight unit, a backlight unit-side polarizing plate, and a liquid crystal cell held by two glass plates, the liquid crystal cell having an electrode, a liquid crystal layer, an alignment layer, and a color filter arranged between the glass plates, a transparent front plate arranged at a side of the liquid crystal cell opposite to the backlight unit, a polarizing plate attached to the liquid crystal cell, and a transparent organic medium layer arranged between the front plate and the liquid crystal cell, the method comprising: treating a surface of the polarizing plate and a surface of the front plate contacting the transparent organic medium layer such that the surfaces have a water contact angle of 10° or less.

The twenty-fifth aspect is a method for manufacturing a liquid crystal display including a backlight unit, a backlight unit-side polarizing plate, and a liquid crystal cell held by two glass plates, the liquid crystal cell having an electrode, a liquid crystal layer, an alignment layer, and a color filter arranged between the glass plates, a transparent front plate arranged at a side of the liquid crystal cell opposite to the backlight unit, the transparent front plate having an anti-reflecting membrane at least one surface of the transparent front plate, a polarizing plate attached to the liquid crystal cell, and a transparent organic medium layer arranged between the front plate and the liquid crystal cell, the method comprising: treating a surface of the polarizing plate and a surface of the front plate contacting the transparent organic medium layer such that the surfaces have a water contact angle of 10° or less.

The twenty-sixth aspect is a method for manufacturing a liquid crystal display including a backlight unit, a backlight unit-side polarizing plate, and a liquid crystal cell held by two glass plates, the liquid crystal cell having an electrode, a liquid crystal layer, an alignment layer, and a color filter arranged between the glass plates, a transparent front plate arranged at a side of the liquid crystal cell opposite to the backlight unit, a transparent organic medium layer arranged between the front plate and the liquid crystal cell, and a polarizing plate attached to the front plate at a side of the transparent organic medium layer, the method comprising: treating a surface of the polarizing plate and a surface of the front plate contacting the transparent organic medium layer such that the surfaces have a water contact angle of 10° or less.

The twenty-seventh aspect is a method for manufacturing a liquid crystal display including a backlight unit, a backlight unit-side polarizing plate, and a liquid crystal cell held by two glass plates, the liquid crystal cell having an electrode, a liquid crystal layer, an alignment layer, and a color filter arranged between the glass plates, a transparent front plate arranged at a side of the liquid crystal cell opposite to the backlight unit, the transparent front plate having an anti-reflecting membrane at least one surface of the transparent front plate, a transparent organic medium layer arranged between the front plate and the liquid crystal cell, and a polarizing plate attached to the front plate at a side of the transparent organic medium layer, the method comprising: treating a surface of the polarizing plate and a surface of the front plate contacting the transparent organic medium layer such that the surfaces have a water contact angle of 10° or less.

It was confirmed that, when the front plate is provided on the polarizing plate such that the transparent organic medium is interposed between the front plate and the polarizing plate, an improvement in wear resistance is obtained. Also, it was confirmed that a reduction in reflectance is caused only by the front plate. Also, it was confirmed that a further reduction in reflectance is achieved in accordance with the provision of the anti-reflecting membrane. In addition, it was confirmed that, when the polarizing plate is attached to the front plate, easy axis adjustment of the polarizing plate is possible.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

First, the outline of the present invention will be described.

[A] Configuration of Image Display Device of Present Invention

The configuration of an image display device according to the present invention will be described with reference to FIGS. 1 to 14.

(1) Front Plate as Outermost Surface

Figure 1A:
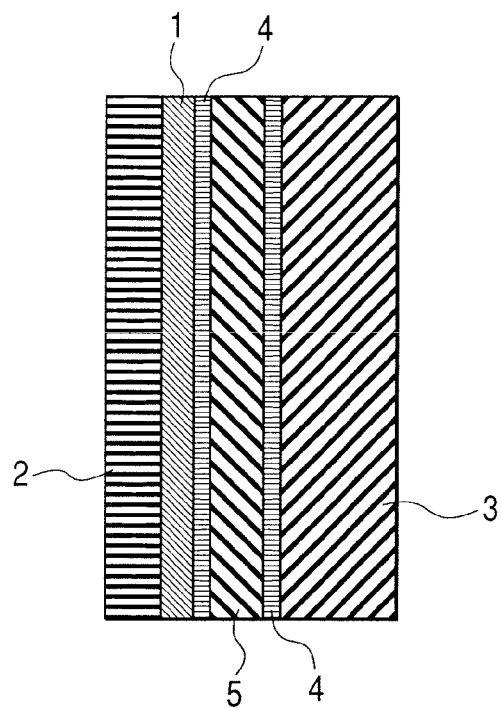
FIGS. 1A and 1B are cross-sectional views schematically illustrating liquid crystal modules of liquid crystal displays according to a first embodiment of the present invention, respectively.
Figure 1B:
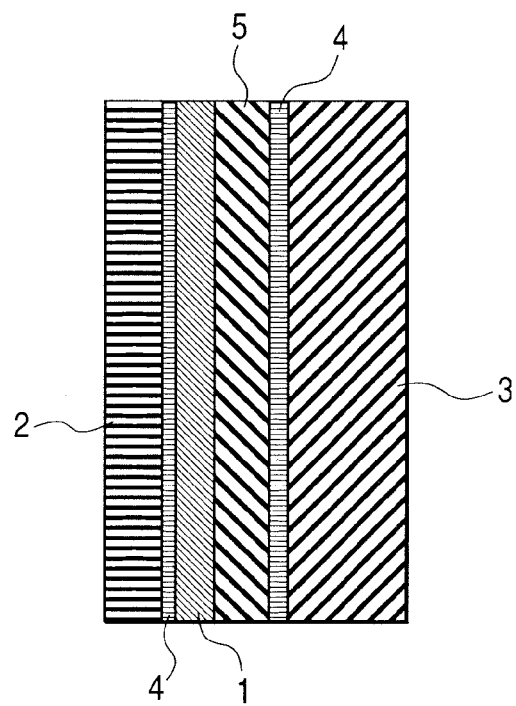

Personal computer monitors or liquid crystal televisions, which are currently commercially available, have a structure which does not include a transparent organic medium layer 1 and a front plate 2 as shown in FIG. 1A. Referring to FIG. 1A, a structure is illustrated in which a polarizing plate 4, a liquid crystal cell 5, and another polarizing plate 1 are arranged over a backlight unit 3 in an overlapped manner. This structure is called a "liquid crystal module". The liquid crystal cell 5 is formed of a liquid crystal layer and a color filter layer, which are arranged between, for example, a pair of transparent glass substrates, an electrode structure for applying an electric field to the liquid crystal layer, and various insulating films. The liquid crystal cell having this structure, the polarizing plates varying optical characteristics, and the backlight unit functioning as a light source are bonded together to form an integrated structure, on which a driver IC for controlling LCD will be mounted. The resulting structure is called a "liquid crystal module". In this case, low wear resistance is exhibited because the outer polarizing plate forms the outermost surface of the structure.

Therefore, in the present invention, a front plate is provided, as shown in FIG. 1A, to achieve an improvement in wear resistance. Also, a transparent organic medium is filled in a gap defined between the front plate and the polarizing plate, to reduce reflection at the backside of the front plate.

The polarizing plate arranged between the liquid crystal cell and the transparent organic medium layer is bonded to the liquid crystal cell in the manufacturing procedure. In this case, however, it is necessary to achieve polarization axis alignment with a high accuracy. Moreover, the bonded polarizing plate cannot be re-bonded. However, when the polarizing plate is bonded to the front plate while achieving polarization axis alignment with a rough accuracy, there is an advantage in that it is possible to again perform polarization axis alignment upon mounting and fixing the front plate, and thus, to increase the accuracy. The reason why this possibility can be realized is that there is no problem associated with display of an image even when the mounted position of the front plate is slightly misaligned.

Figure 2A:
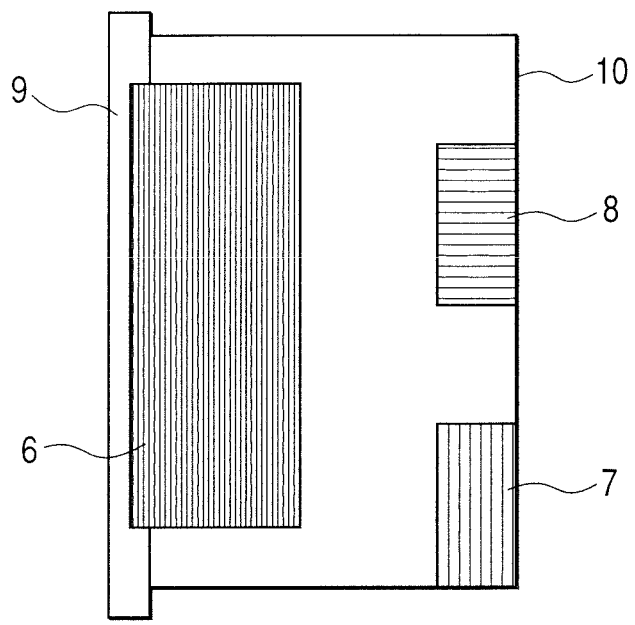
FIGS. 2A and 2B are cross-sectional views schematically illustrating liquid crystal displays according to the present invention, respectively.
Figure 2B:
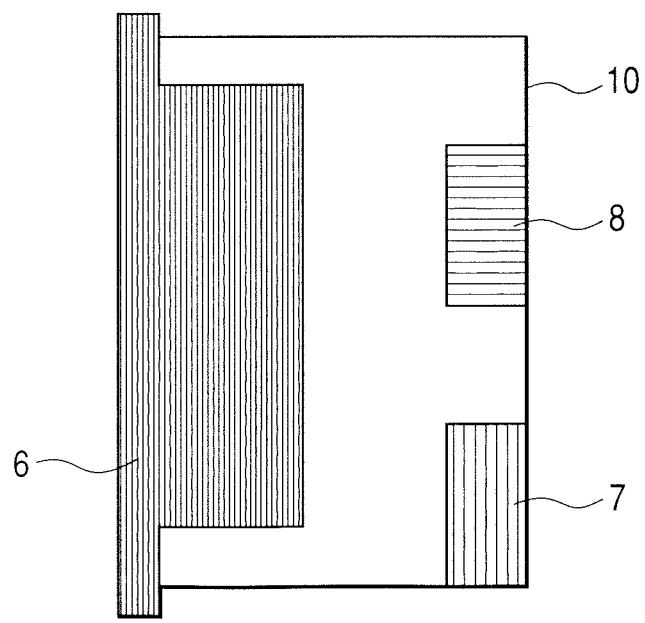

As shown in FIG. 2A or 2b, a liquid crystal display can be manufactured by mounting liquid crystal modules 6 each having the above-described structure, and mounting a power supply unit 7, a controller 8, a front outside frame 9, and a rear outside frame 10. For simplicity of description, the following description will be given in conjunction with one liquid crystal module 6. FIG. 2A illustrates an example in which the front plate has a size approximately equal to that of the liquid crystal cell. FIG. 2B illustrates an example in which there is no front outside frame. In the case of FIG. 2B, there is no significant problem in terms of functions even when the front outside frame is used. Liquid crystal modules, which are illustrated in FIGS. 3 to 5 and FIGS. 11 to 14 to be described later, have the same configuration as that of FIG. 2A or 2b.

(2) Formation of Anti-Reflecting Membrane on Front Plate

Refection occurs due to a difference between the refractive index of the front plate and the refractive index of air. Therefore, a liquid crystal display is provided which has a structure shown in FIG. 3A wherein an anti-reflecting membrane 11 is formed on the front plate, to reduce reflection, and to improve visibility. In this case, it is desirable to use an anti-reflecting membrane made of an inorganic oxide, in order to secure sufficient wear resistance.

Figure 3A:
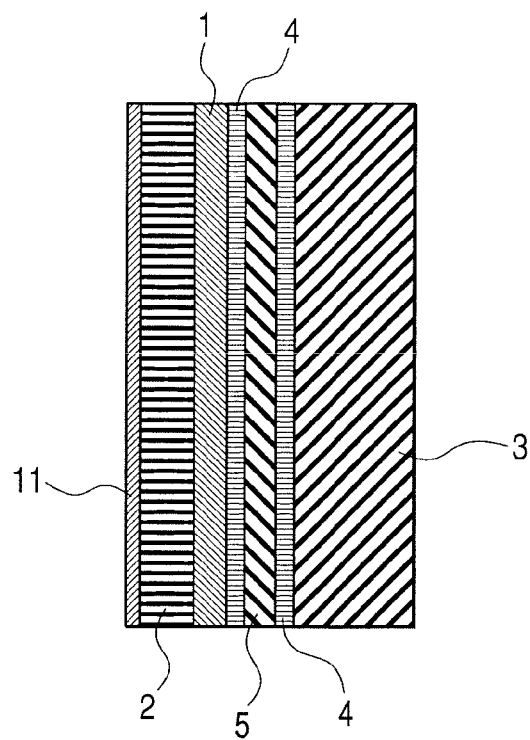
FIGS. 3A and 3B are cross-sectional views schematically illustrating liquid crystal modules of liquid crystal displays according to a second embodiment of the present invention, respectively.
Figure 3B:
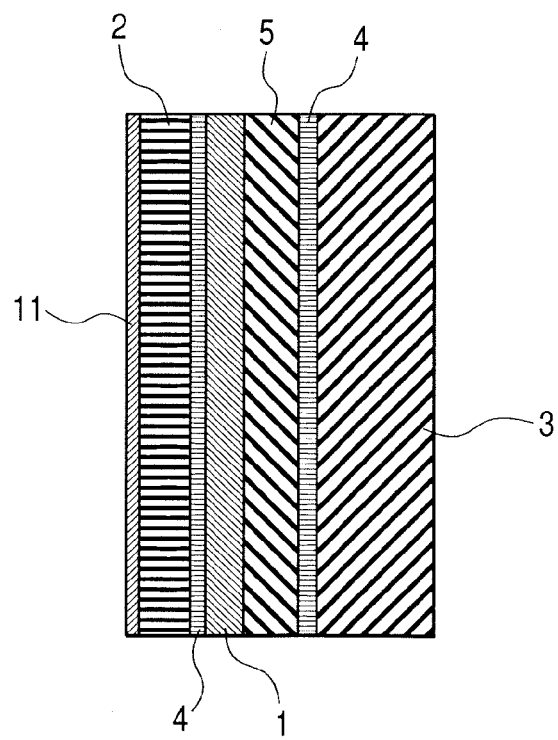

FIG. 3B illustrates the case in which a polarizing plate is mounted to the front plate. This case has the same effect as that of FIG. 1B described in association with Item 1.

(3) Formation of Anti-Reflecting Membranes at Both Sides of Front Plate

Figure 4A:
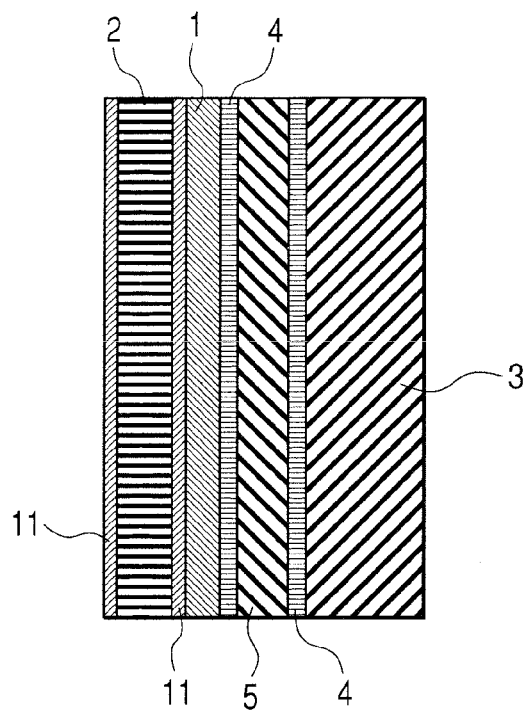
FIGS. 4A and 4B are cross-sectional views schematically illustrating liquid crystal modules of liquid crystal displays according to a third embodiment of the present invention, respectively.

When the anti-reflecting membrane formation is carried out without masking in accordance with dip coating, flow coating, or the like, anti-reflecting membranes are formed at both surfaces of the front plate, respectively. Where the front plate is made of resin, it is difficult to achieve filling of a transparent organic medium because the surface hydrophilicity of the front plate is low. That is, penetration of bubbles may easily occur, whereas escape of the penetrated bubbles is difficult. Accordingly, an anti-reflecting membrane made of inorganic oxide is used to achieve an improvement in surface hydrophilicity. Thus, there is an effect capable of promoting the filling of the transparent organic medium. Also, the close adherence of the polarizing plate required when the polarizing plate is bonded can be enhanced by virtue of the improved surface hydrophilicity. The provision of anti-reflecting membranes at the both surfaces of the front plate is shown in FIG. 4A.

Figure 4B:
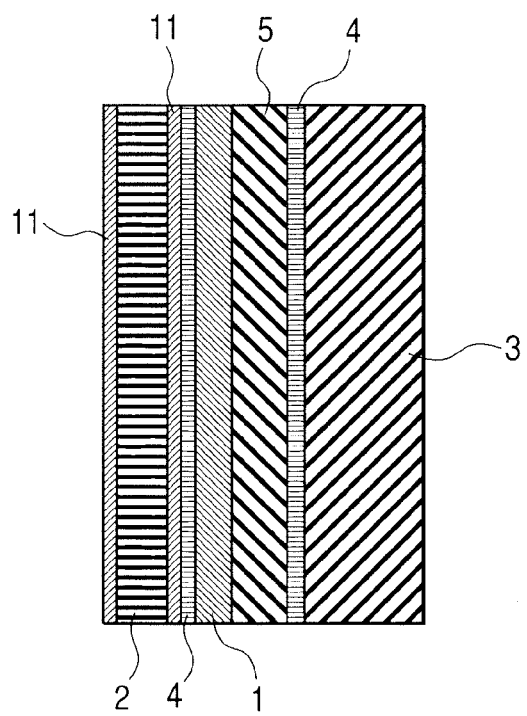

FIG. 4B illustrates the case in which a polarizing plate is mounted to the front plate. The effect obtained in this case is identical to that of FIG. 1B described in association with Item 1.

(4) Holding of Liquid Crystal Module by Frame

Figure 5A:
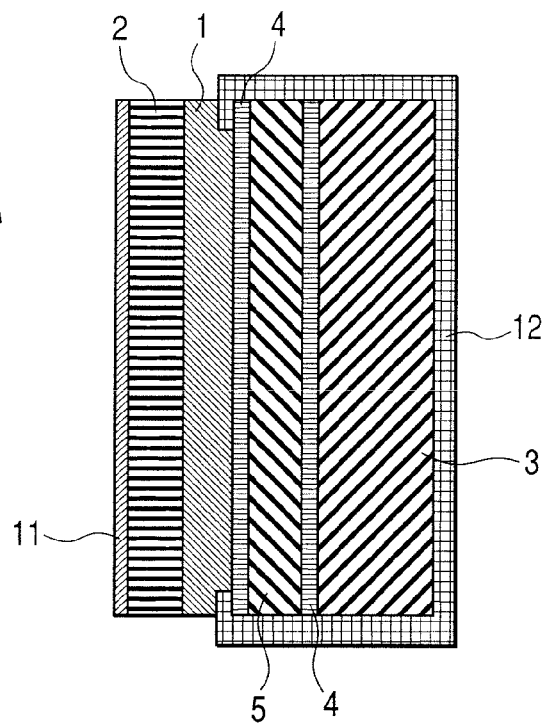
FIGS. 5A and 5B are cross-sectional views schematically illustrating liquid crystal modules of liquid crystal displays according to a fourth embodiment of the present invention, respectively.

In the case of a personal computer monitor or liquid crystal television, which is currently commercially available, all the backlight unit, polarizing plate, and liquid crystal cell thereof are held by a frame, together with the outer polarizing plate, as shown in FIG. 5A. To this structure, the controller, power supply unit, and outside frame are mounted, to enable the resulting structure to function as an image display device. Since the transparent organic medium layer and front plate may be mounted after complete manufacture of the liquid crystal module, there is an advantage in that it is unnecessary to vary the existing process for manufacturing the liquid crystal module.

Figure 5B:
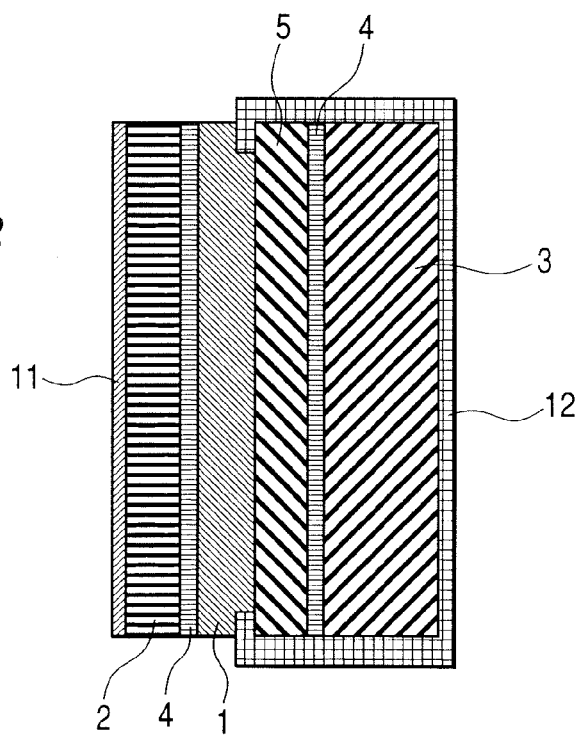
Figure 6A:
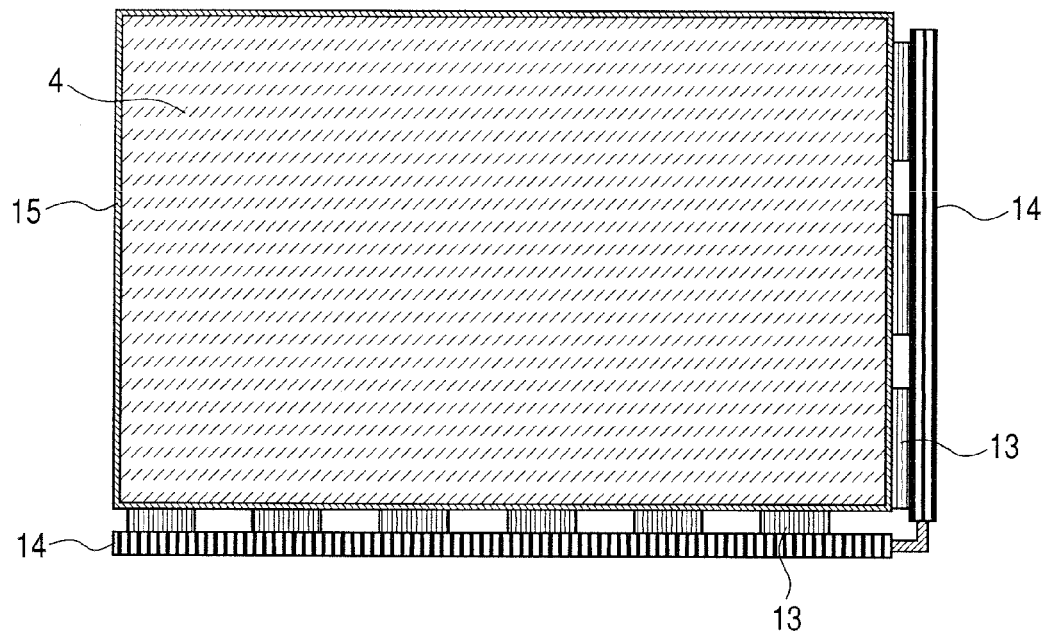
FIGS. 6A and 6B are views illustrating a polarizing plate/liquid crystal cell/polarizing plate/backlight unit part of a liquid crystal display according to the present invention.
Figure 6B:
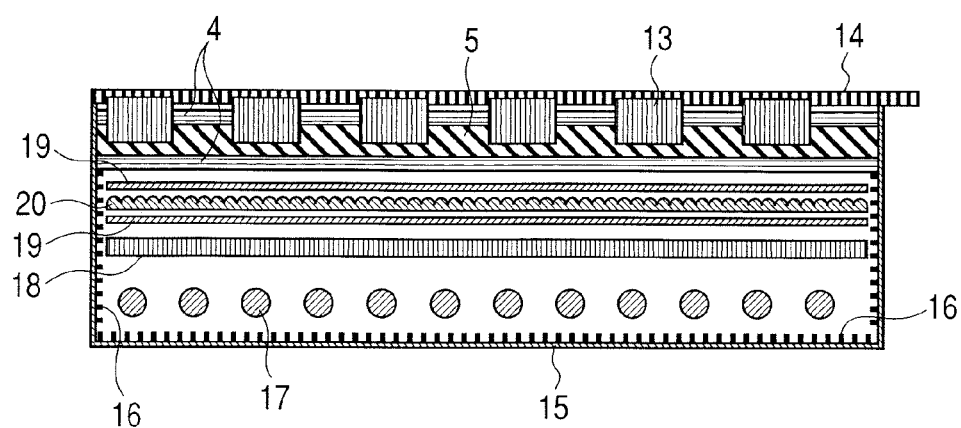

FIG. 5B illustrates the case in which a polarizing plate is mounted to the front plate. The effect obtained in this case is identical to that of FIG. 1B described in association with Item 1.

The polarizing plates, liquid crystal cell, and backlight unit are shown in detail in FIGS. 6A and 6B, or FIGS. 7A and 7B. In this case, a driver IC 13 for controlling LED is arranged beneath the liquid crystal cell, and is connected to a flexible printed circuit (FPC) board 14. The backlight unit and liquid crystal panel are received in a backlight unit/liquid crystal panel housing 15. A reflecting layer 16 is coated over an inner surface of the housing 15. The reflecting layer 16 reflects light emitted from a fluorescent layer 17, to enable light to be used for display of an image as much as possible. Light advancing from fluorescent tubes toward an image display surface first passes through a diffusing plate, so that the light is diffused. Thereafter, the light is incident to the liquid crystal cell after passing through optical sheets such as a diffusing sheet 19 and a prism sheet 20. Meanwhile, in this case, a top cover 21 is provided for the housing, in order to prevent the liquid crystal cell from moving.

The driver IC for controlling LCD has a drain function. When the backlight is turned on for a prolonged period of time, the liquid crystal panel is heated by heat generated during the ON state of the backlight. In this case, the top portion of the liquid crystal panel is greatly heated, as compared to other portions of the liquid crystal panel, so that the temperature thereof is greatly increased. If the driver IC for controlling LCD is coupled to the top portion of the liquid crystal panel, damage of elements thereof caused by heat is increased because the driver IC for controlling LCD is greatly heated. As a result, the durability of the panel is degraded. Even when there is no damage of elements, heat is transferred to the liquid crystal cell. For this reason, there may be a problem in that the image displayed through the liquid crystal cell may be dimmed when the liquid crystal cell is heated over the operational temperature of liquid crystals. For this reason, it is ideal that the driver IC for controlling LCD is arranged beneath the liquid crystal cell. However, where the driver IC for controlling LCD is arranged beneath the liquid crystal cell, as in the conventional liquid crystal display, there may be a possibility that, when the liquid crystal display is wiped using a wet duster, water may be penetrated into the polarizing plate via the image display surface, and then, into the driver IC for controlling LCD. As a result, a short circuit may be generated. For this reason, taking into consideration the normal handling of the device by the user, it is necessary to provide an appropriate watertight effect for the arrangement of the driver IC for controlling LCD beneath the liquid crystal cell. In the above-described case, water tightness is obtained in accordance with the provision of the front plate. Accordingly, it is possible to arrange the driver IC for controlling LCD beneath the liquid crystal cell. Thus, the driver IC for controlling LCD and liquid crystal panel can have an extend life span.

Figure 7A:
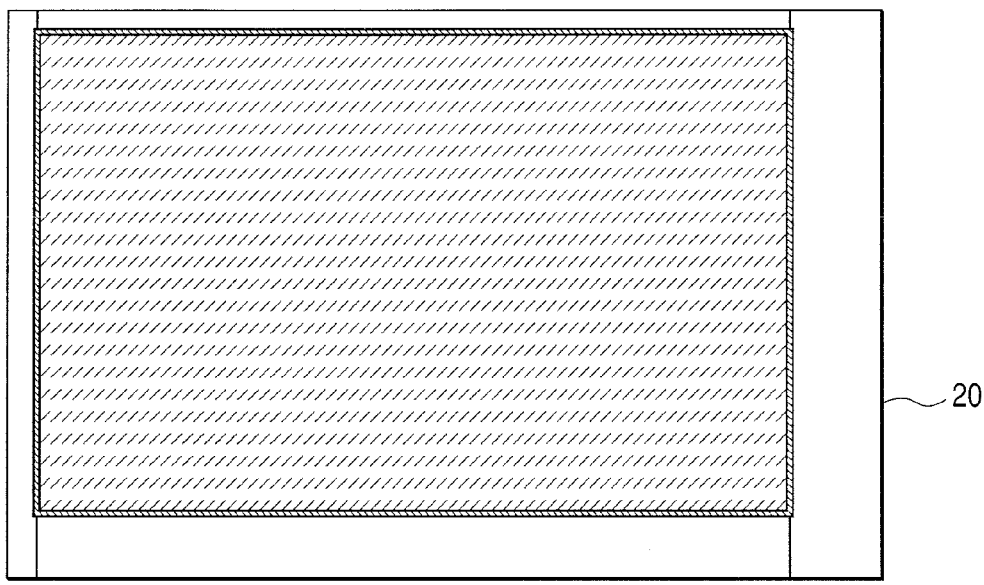
FIGS. 7A and 7B are views illustrating a polarizing plate/liquid crystal cell/polarizing plate/backlight unit/frame part of a liquid crystal display according to the present invention.
Figure 7B:
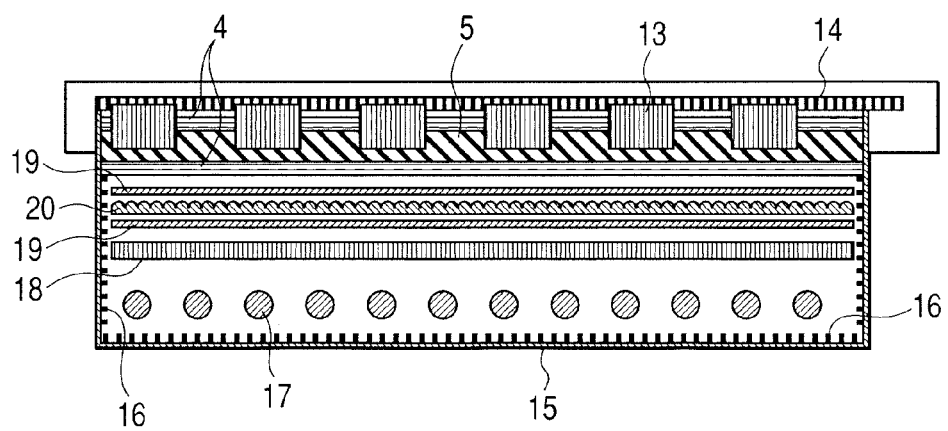
Figure 8A:
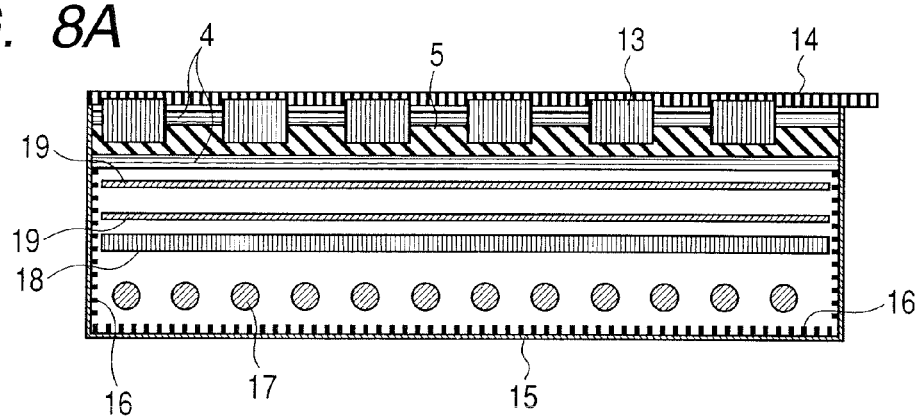
FIGS. 8A and 8B are views illustrating a polarizing plate/liquid crystal cell/polarizing plate/backlight unit part of a liquid crystal display according to the present invention.
Figure 8B:
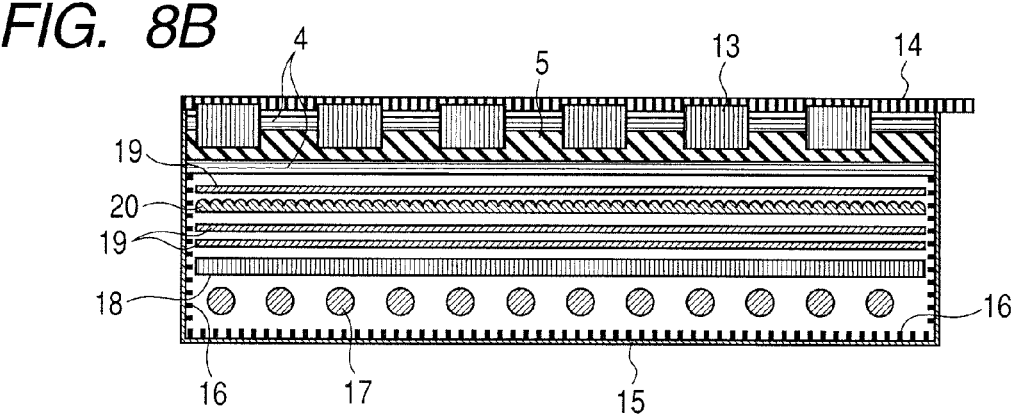

FIGS. 8A and 8B illustrate a structure different from that of FIG. 7 in terms of the number and configuration of optical sheets including at least one diffusing sheet and at least one prism sheet arranged between the backlight and the outer polarizing plate or liquid crystal cell. In the design of the display device, a desired number and desired configurations of the optical sheets are appropriately selected in accordance with the performance of the used diffusing plate or plates and the diffusion properties of the backlight.

Figure 9:
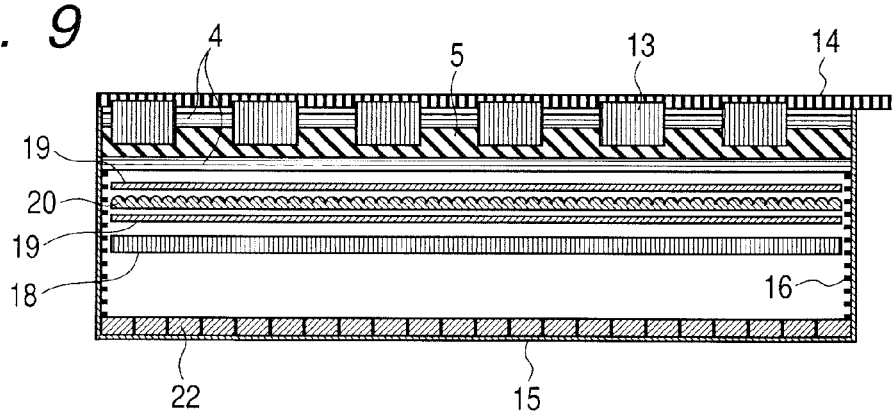
FIG. 9 is a view illustrating a backlight unit part of a liquid crystal display according to the present invention constituted by a polarizing plate/liquid crystal cell/polarizing plate/light emitting diode configuration.
Figure 10:
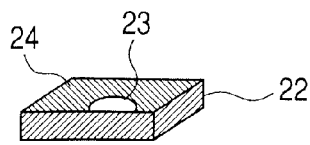
FIG. 10 is a view illustrating a structure of the light emitting diode included in the backlight unit of the liquid crystal display according to the present invention.

In the cases of FIGS. 6a to 8b, fluorescent tubes are used. In FIG. 9, a configuration using light emitting diodes 22 (in some cases, also referred to as "LEDs") is illustrated. Each light emitting diode 22 includes a light emitting portion 23, and a reflecting surface 24 arranged around the light emitting portion 23. In the design of the display device, one or both of the fluorescent tube configuration and light emitting diode configuration are appropriately selected.

(5) Holding of Liquid Crystal Module from Backlight Unit to Front Plate by Frame In the case of a personal computer monitor or liquid crystal television, which are currently commercially available, a controller, a power supply unit, and an outer frame are mounted to a liquid crystal module (all the backlight unit, polarizing plate, and liquid crystal cell of the liquid crystal module are held by a frame, together with the outer polarizing plate, as shown in FIG. 5A), in order to enable the resulting structure to function as an image display device. Since even the transparent organic medium layer and front plate are held by the frame, as shown in FIG. 11A, there is an advantage in that it is possible to manufacture a personal computer monitor or a liquid crystal television without varying the existing process for manufacturing the liquid crystal display.

Figure 11A:
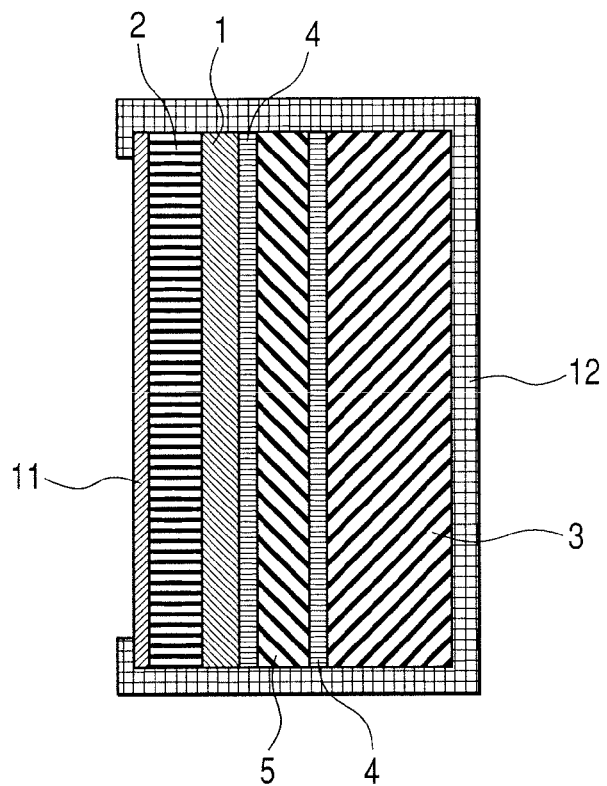
FIGS. 11A and 11B are cross-sectional views schematically illustrating liquid crystal displays according to a fifth embodiment of the present invention, respectively.
Figure 11B:
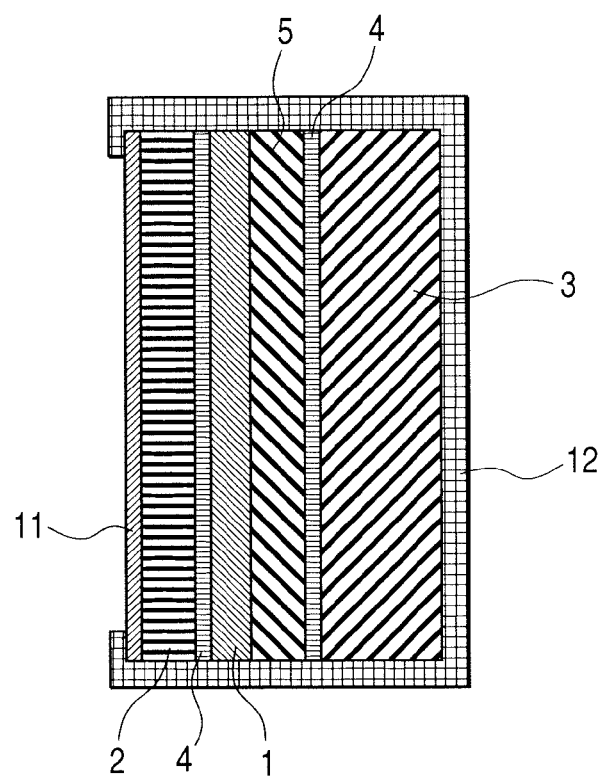

FIG. 11B illustrates the case in which a polarizing plate is mounted to the front plate. The effect obtained in this case is identical to that of FIG. 1B described in association with Item 1.

(6) Fixing of Front Plate to Frame

In the case of FIG. 11a or 11b, even the front plate is held by the frame. For example, in the case of a 32-inch liquid crystal television (TV), the front plate has a weight of about 1.5 Kg by itself when it is formed of a glass sheet having a thickness of 2 mm. When the front plate is fabricated using a glass sheet having a thickness of 3 mm, it may have a weight of about 2.2 Kg. For this reason, the frame, which holds the front plate, is required to use a frame member thicker than those of conventional cases. However, this is undesirable because the weight of the liquid crystal TV is also increased.

Figure 12A:
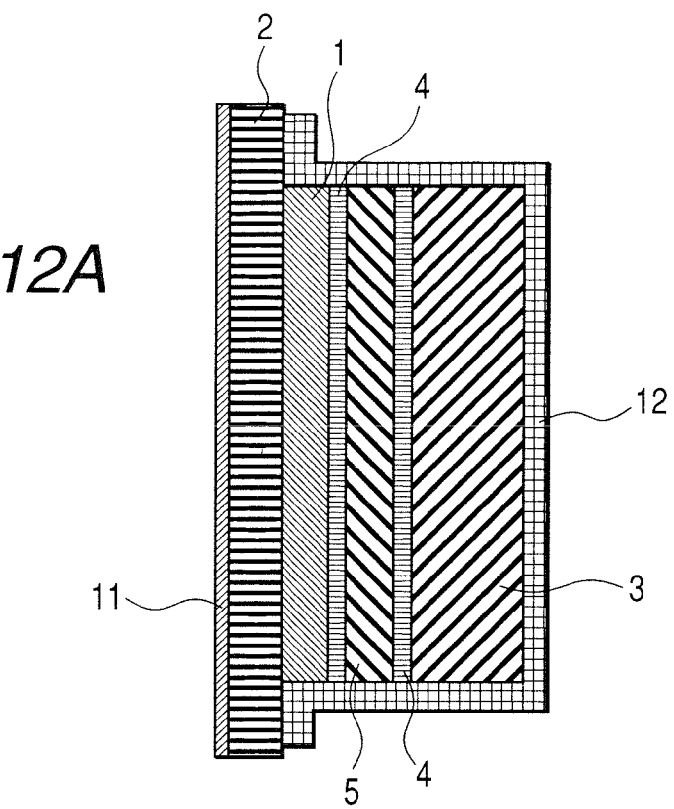
FIGS. 12A and 12B are cross-sectional views schematically illustrating liquid crystal displays according to a sixth embodiment of the present invention, respectively.

When the front plate is fixed to the frame, as shown in FIG. 12A, it is possible to not only support the frame, but also to support other members along with the front plate. In this case, accordingly, it is unnecessary to increase the thickness of the frame. That is, it is possible to reduce the material amount of the used frame, and thus, to correspondingly reduce the costs. Since the thickness of the frame is reduced, there is also an advantage of easy workability.

Figure 12B:
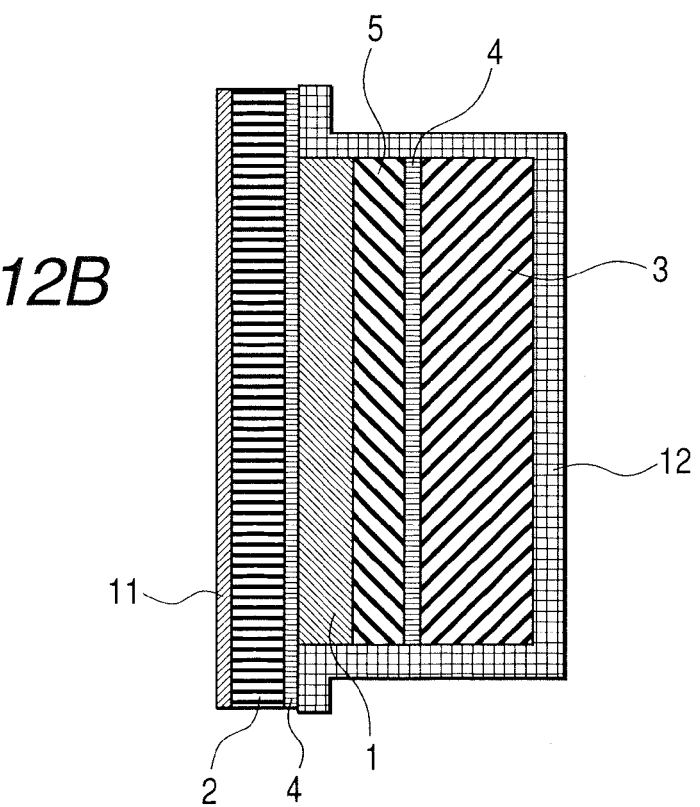

FIG. 12B illustrates the case in which a polarizing plate is mounted to the front plate. The effect obtained in this case is identical to that of FIG. 1B described in association with Item 1.

Figure 13A:
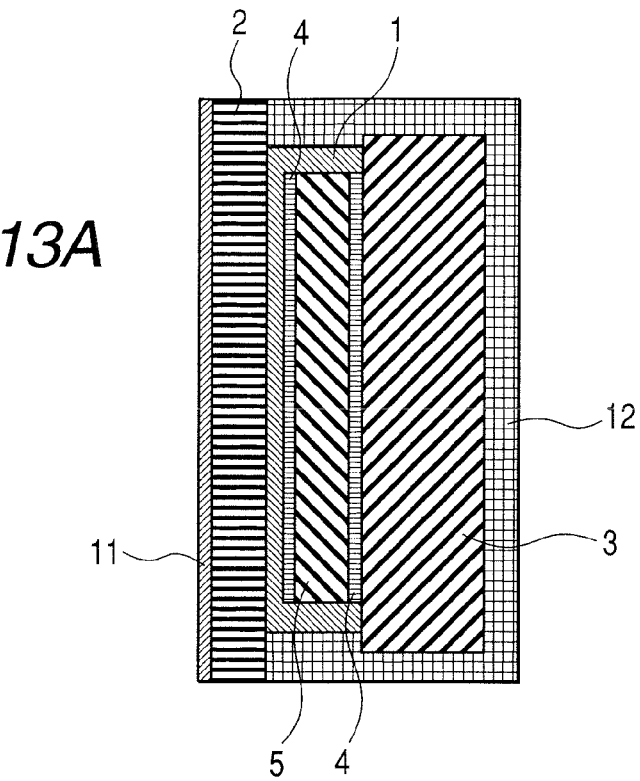
FIGS. 13A and 13B are cross-sectional views schematically illustrating liquid crystal displays according to a seventh embodiment of the present invention, respectively.
Figure 14A:
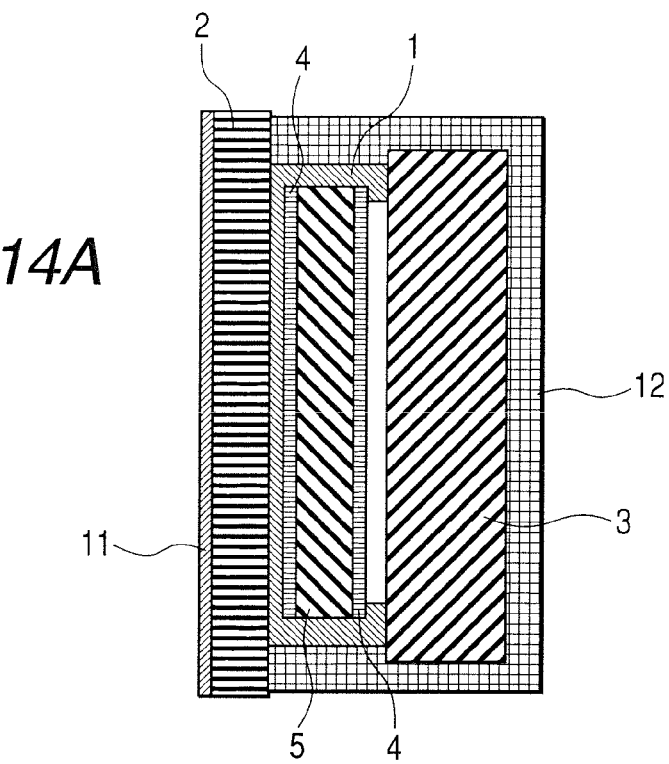
FIGS. 14A and 14B are cross-sectional views schematically illustrating liquid crystal displays according to an eighth embodiment of the present invention, respectively.

(7) Support of Polarizing Plate and Liquid Crystal Cell by Transparent Organic Medium Layer As shown in FIGS. 13A and 14a, the polarizing plate and liquid crystal cell are supported by a transparent organic medium layer, and all the members are supported by the front plate. In this case, accordingly, only the backlight is supported by the frame. For this reason, it is possible to reduce the thickness of the frame, as compared to the case described in association with Item 6. That is, it is possible to further reduce the material amount of the used frame, and thus, to correspondingly reduce the costs. Since the thickness of the frame is further reduced, there is also an advantage of easier workability.

Figure 13B:
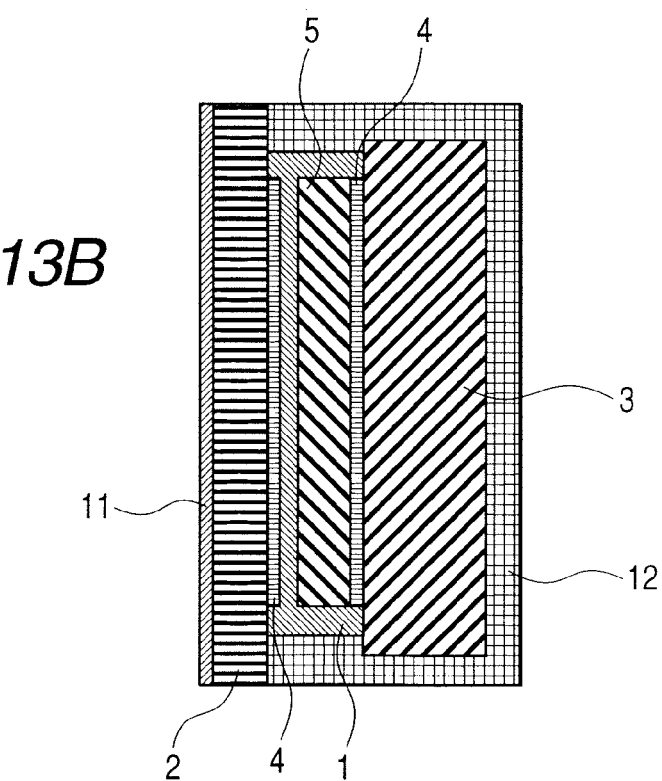
Figure 14B:
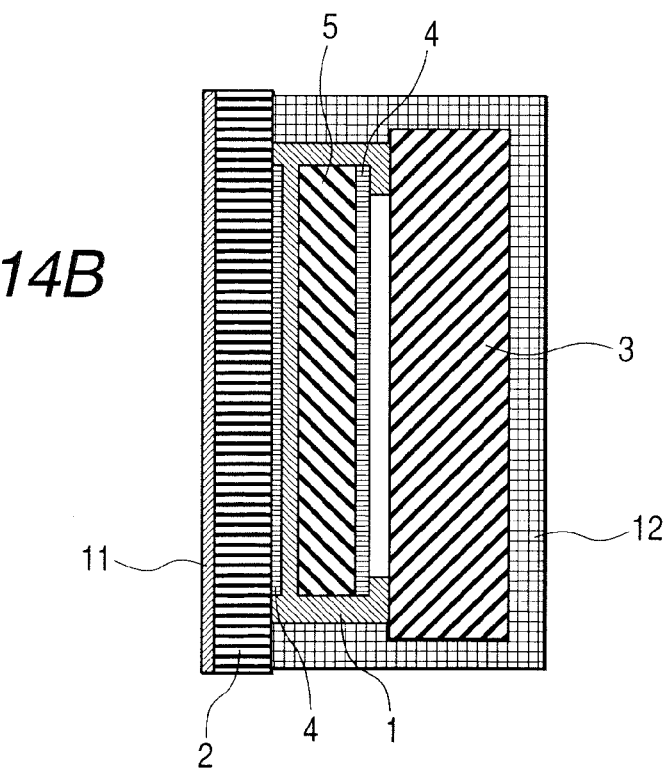

FIGS. 13b and 14b illustrate the cases in which a polarizing plate is mounted to the front plate. The effect obtained in this case is identical to that of FIG. 1B described in association with Item 1.

[B] Constituent Unit, Members, Etc.

(1) Backlight Unit

The backlight unit includes a light source and optical sheets. The light source may include a cold cathode fluorescence lamp or LEDs. The optical sheets may include a waveguide plate, a diffusing sheet, a prism sheet, and a reflecting and polarizing sheet.

(2) Polarizing Plate

The polarizing plate is a plate having a function for allowing only the light with a specific vibration direction to be transmitted therethrough. In the present invention, the polarizing plate is not particularly limited. For the polarizing plate, those used in conventional liquid crystal displays may be used. Two polarizing plates are used in one display device. One polarizing plate is arranged between the backlight unit and the liquid crystal layer. Although the other polarizing plate is arranged at different positions for different cases, the function of the polarizing plate itself can be achieved in any case.

(3) Liquid Crystal Cell

Generally, in a liquid crystal cell, a transparent electrode, an alignment layer, a liquid crystal layer, another alignment layer, and a color filter are held, in this order, between two glass substrates. It is assumed that the liquid crystal cell of the present invention has this configuration. Other configurations may be used in the liquid crystal display of the present invention, as long as they can achieve the same function as that of the above-described configuration.

(4) Front Plate

For the front plate, a transparent plate exhibiting no or little absorption of light of a visible range and high wear resistance is desirable. Even when the front plate has high hardness, it may be easily scratched if its surface is rough, when it is wiped by a duster with sharp particles or sand attached thereto. This is because the grooves present in the surface of the front plate may be strongly wiped. Where the front plate is made of tri-acetyl cellulose, it may be easily scratched because, although tri-acetyl cellulose has a pencil hardness of 2 to 3H, as described above, it exhibits an arithmetic average roughness Ra of 150 to 500 nm at the surface of the front plate in accordance with anti-glaring.

Taking into consideration this fact, a glass plate having a pencil hardness of 9H or more, an acrylic resin plate having a pencil hardness of 2H, or a tri-acetyl cellulose plate having a pencil hardness of 2 to 3H may be used for the front plate. As described above, it is preferred that the plate used for the front plate have a planar surface having small-size irregularities, more particularly, an arithmetic average roughness Ra of 100 nm or less, preferably, 10 nm or less.

Although the thickness of the front plate depends on the size of the liquid crystal display area, it is preferable to be 0.7 mm or more in the case of the front plate made of glass, and to be 1 mm or more in the case of the front plate made of resin such as acrylic resin. When the front plate has a smaller thickness, it may be deformed during the manufacture thereof. This deformation affects the evenness of the display surface of the product.

The front plate may have a size larger than those of the transparent organic medium layer, polarizing plates, liquid crystal cell, and backlight unit, as shown in FIGS. 7A and 7B.

(5) Transparent Organic Medium

In the present invention, the transparent organic medium has a solid or liquid phase at normal temperature.

The transparent organic medium exhibits a reduced reflectance as it has a refractive index more approximate to those of the front plate and polarizing plates. As will be described hereinafter, the front plate has a composition containing glass (refractive index of 1.05 to 1.54), acrylic resin (refractive index of 1.49), polyethylene terephthalate (PET) (refractive index of 1.56), and polycarbonate (refractive index of 1.59).

Here, when it is assumed that the refractive index of the front plate is "$n_0$", and the refractive index of the transparent organic medium is "$n$", the reflectance R at the interface between the front plate and the transparent organic medium can be derived using the following equation:

$$R=[(n_0-n)/(n_0+n)]^2$$

When there is no transparent organic medium inside the front plate, that is, when the front plate is in contact with an air layer (refractive index of 1.0), reflection of about 3.7 to 5.2% occurs at the interface between the front plate and the air layer.

The reflection is caused by the refractive index difference between the front plate and air. Accordingly, it is possible to reduce reflection by filling, in the air layer, a transparent medium having a refractive index approximate to that of the front plate, to substitute air with the transparent medium.

Under the condition in which the front plate is directly exposed to the sun, a considerable improvement in visibility can be achieved if the reflectance of about 3.7 to 5.25% at the interface between the front plate and the transparent organic medium can be reduced to about 0.5%. Refractive indexes enabling the reflectance at one surface of the front plate to be reduced to about 0.5% in accordance with filling of a transparent organic medium can be derived using the above-described equation. The derived refractive indexes are described in the following Table 1.

TABLE 1

| Refractive Index of Front Plate ($n_0$) | Refractive Index of Transparent Organic Medium (n) | Reflectance (%) | $\|n_0 - n\|$ (Difference between $n_0$ and n) |
|---|---|---|---|
| 1.48 | 1.28 | 0.53 | 0.20 |
| 1.48 | 1.38 | 0.12 | 0.10 |
| 1.48 | 1.18 | 0.85 | 0.25 |
| 1.54 | 1.34 | 0.48 | 0.20 |
| 1.59 | 1.39 | 0.50 | 0.21 |
| 1.48 | 1.70 | 0.48 | 0.22 |
| 1.54 | 1.77 | 0.48 | 0.23 |
| 1.59 | 1.83 | 0.49 | 0.24 |

Referring to the above table, it can be seen that, in order to reduce the reflectance to about 0.5%, it is preferred that the difference between the refractive index of the front plate and the refractive index of the transparent organic medium be 0.2 or less.

Accordingly, when it is assumed that the refractive index of the front plate is "$n_0$", and the refractive index of the transparent organic medium is "$n$", the reflectance R at the interface between the front plate and the transparent organic medium can be derived using the following equation:

$$n_0-0.2<n<n_0+0.2$$

For the transparent organic medium, the following may be used.

For a solid transparent organic medium, a thermosetting resin or photo-curable resin, which will be polymerized in accordance with thermosetting or photo-curing of monomers, may be used. In addition, a completely-polymerized thermoplastic resin may be used.

The thermosetting resin or photo-curable resin can fill a gap defined inside the front panel by filling a monomer, as described above, in the gap, and setting or curing the monomer in accordance with application of appropriate heat or irradiation of light. Examples of monomers of the above-described resins include a monomer having a polymerizable double bond, a monomer polymerizable with another different monomer or a polymer, a monomer polymerizable by dehydration reaction, and a monomer polymerizable by alcohol elimination reaction.

Examples of the monomer having a polymerizable double bond include styrene, methyl methacrylate, ethyl methacrylate, propyl methacrylate, iso-propyl methacrylate, buthyl methacrylate, iso-buthyl methacrylate, hexyl methacrylate, octhyl methacrylate, 2-ethylhexyl methacrylate, decyl methacrylate, dodecyl methacrylate, methyl acrylate, ethyl acrylate, propyl acrylate, iso-propyl acrylate, buthyl acrylate, iso-buthyl acrylate, hexyl acrylate, oethylacrylate, 2-ethylhexyl acrylate, decyl acrylate, and dodecyl acrylate. One or more of these monomers are used to form a transparent organic medium layer. These monomers may also be co-polymerized with another polymer or monomer, to form a transparent organic medium layer. In this case, examples of the polymer may include polyacrylic acid and polyvinyl alcohol. Examples of the monomer include ethylene glycol, propylene glycol, diethylene glycol, 1,3-dihydroxycyclobutane, 1,4-dihydroxycyclohexane, and 1,5-dihydroxycyclooctane, each of which has a hydroxyl group in the molecular structure thereof, and ethylene glycol monoglycidyl ether and ethylene glycol diglycidyl ether, each of which has a glycidyl group at a terminal thereof.

Examples of the monomer polymerizable by dehydration reaction include a monomer having two or more hydroxyl groups or glycidyl groups, or two or more amino groups at terminals thereof, and a monomer having two or more carboxyl groups or carboxyl acid anhydride structures at terminals thereof. An example of a polymer produced in accordance with polymerization of monomers by dehydration reaction include a polymer produced in accordance with polycondensation of the monomer having two or more hydroxyl groups or glycidyl groups, or two or more amino groups at terminals thereof, and the monomer having two or more carboxyl groups or carboxyl acid anhydride structures at terminals thereof. Examples of the monomer having hydroxyl groups at terminals thereof include ethylene glycol, propylene glycol, diethylene glycol, 1,3-dihydroxycyclobutane, 1,4-dihydroxycyclohexane, 1,5-dihydroxycyclooctane, and polyethylene glycol. Examples of the monomer having glycidyl groups at terminals thereof include ethylene glycol monoglycidyl ether and ethylene glycol diglycidyl ether.

Examples of the monomer having amino groups at terminals thereof ethylenediamine, 1,4-diaminobutane, 1,6-diaminohexane, 1,4-diaminobenzene-6-diaminonaphthalene, and melamine. Examples of the monomer having carboxyl groups at terminals thereof include adipic acid, 1,3-phthalic acid, 1,4-phthalic acid, fumaric acid, maleic acid, trimesic acid, and pyromellitic acid. Examples of the monomer having carboxyl acid anhydride structures at terminals thereof include maleic anhydride, phthalic anhydride, trimellitic anhydride, and pyromellitic anhydride. Examples of a monomer polymerizable by alcohol elimination reaction include a compound having an alkoxy silane group and a compound having an alkoxy titane group. Examples of the monomer polymerizable by alcohol elimination reaction include tetramethoxy silane, tetraethoxy silane, tetrapropoxy silane, tetrabuthoxy silane, methyl trimethoxy silane, ethyl trimethoxy silane, buthyl trimethoxy silane, methyl triethoxy silane, ethyl triethoxy silane, buthyl triethoxy silane, 3-aminopropyl triethoxy silane, 3-chloropropyl triethoxy silane, and 3-glycidylpropyl triethoxy silane.

The transparent organic medium layer may have an improved impact buffering function by using a high elastic material such as polyisobutylene. It is preferred that the transparent organic medium have an elasticity ranging from hardness of 5 to hardness of 40 when being measured in accordance with the rubber hardness measurement Standard JIS K 6253. It is more preferable that the elasticity ranges from hardness of 10 to hardness of 30. When the transparent organic medium has hardness of less than 5, there may be a possibility that a degradation in reliability occurs when the front plate is held on the liquid crystal display for a prolonged period of time. On the other hand, when the transparent organic medium has hardness of more than 40, it is likely to exhibit a degraded impact buffering effect.

Examples of a thermoplastic resin include polystyrene, styrene/acrylic resin, acrylic resin, polyester resin, polypropylene, and polyisobuthylene. These are liquefied when being heated to Tg or more, in order to achieve easy filling thereof.

Figure 15:
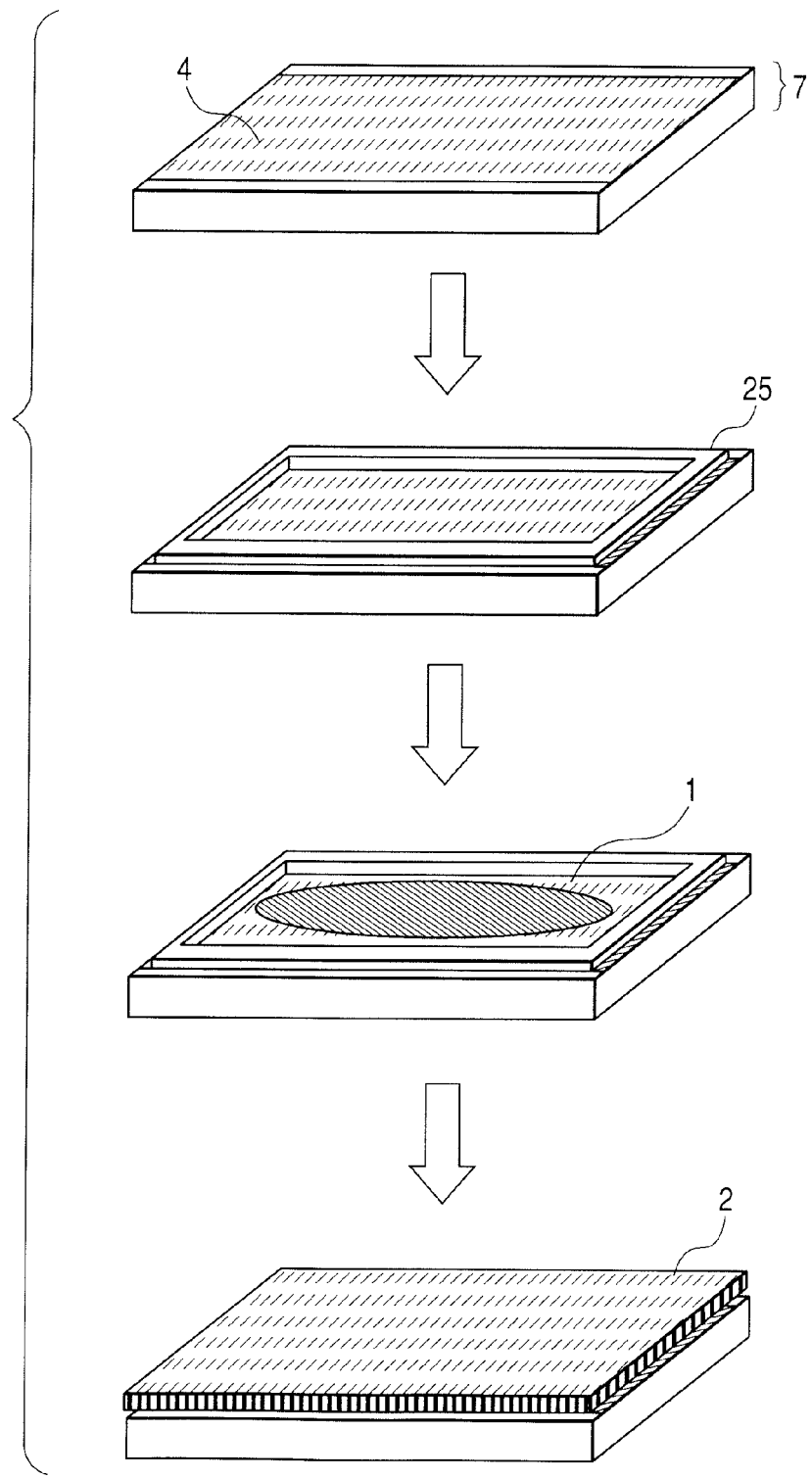
FIG. 15 is a schematic view illustrating a process for filling a transparent organic medium in the manufacture of the liquid crystal display according to the present invention.

When the transparent organic medium is liquid, or when the monomer is liquid, the filling of the transparent organic medium is carried out in accordance with the following method. First, a bank 25 is formed around the members (the front plate or polarizing plate, and the liquid crystal cell) with which the transparent organic medium will come into contact. In the case of the transparent organic medium layer shown in FIGS. 1A and 1B, FIGS. 3a to 5b, or FIGS. 11a to 14b, a bank is provided if the transparent organic medium layer is liquid, or if the monomer is liquid, even though not shown. Thereafter, injection of the transparent organic medium is carried out. If bubbles are present in the injected transparent organic medium, they are removed by pressurizing or pressurizing/heating the transparent organic medium using an autoclave or the like, applying vibrations to the transparent organic medium using a vibrator or the like, or sucking the bubbles. This process is schematically shown in FIG. 15.

In order to achieve easy removal of bubbles, it is preferable to improve the hydrophilicity of a surface with which the transparent organic medium comes into contact. More particularly, this surface is a contact surface of the front plate, polarizing plate, anti-reflecting membrane, or liquid crystal cell with which the transparent organic medium comes into contact. When the contact surface has an improved hydrophilicity, the transparent organic medium can more easily adhere to the contact surface, as compared to air. As a result, bubbles can more easily escape. More particularly, it is preferred that the hydrophilicity based on water correspond to a water contact angle of 20°. At this hydrophilicity, it is possible to fill the transparent organic medium while substantially preventing penetration of bubbles. In order to more reliably reduce penetration of bubbles, it is preferred that the water contact angle be 10° or less.

Where the bank covers the image display surface, a transparent member is used for the bank, in order to prevent the edge of the displayed image from being invisible due to the bank. Where the bank does not cover the image display surface, it is unnecessary for the bank to be transparent. In this case, it is desirable to use a black bank, in order to obtain increased distinctness of the displayed image.

In addition, the size of the transparent organic medium layer may be larger than those of the polarizing plate and liquid crystal cell, as shown in FIGS. 13A and 13B.

Where the transparent organic medium is liquid, it is preferred that a solvent having a relatively high boiling point be used for the liquid component of the transparent organic medium, in order to prevent the liquid component from being easily volatilized by heat emitted from the liquid crystal display. Examples of the solvent include alcohol (6 carbons or more), diol (ethylene glycol, propylene glycol, etc.), hydrocarbon (10 carbons or more), ethylene glycol monoalkylether, ethylene glycol monoalkylester, diethylene glycol monoalkylether, diethylene glycol monoalkylester, triethylene glycol monoalkylether, and triethylene glycol monoalkylester.

Figure 16:
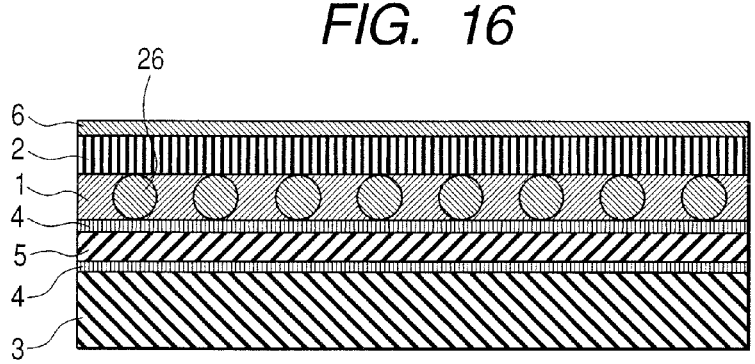
FIG. 16 is a schematic view illustrating a transparent organic medium layer containing layer thickness control particles used in the present invention.

Preferably, the transparent organic medium layer has a thickness of at least 0.1 mm, in order to secure a desired accuracy in the formation of the bank, or to enable easy escape of bubbles where the transparent organic medium is liquid. When the thickness of the transparent organic medium layer is excessive, the transparent organic medium layer is excessively heavy, in particular, in the case of liquid. In this case, it is difficult for the bank to hold the liquid. For this reason, it is preferred that the thickness of the transparent organic medium layer does not exceed 10 mm. In order to make the transparent organic medium layer have a constant thickness, a method may be used in which transparent particles (layer thickness control particles) 26 having a diameter approximately equal to a target thickness of the layer are used. In accordance with this method, the particles are put into the gap, in which the transparent organic medium will be filled, such that the particles do not overlap with one another, and then the transparent organic medium is filled in the gap. By the particles, it is possible to control the thickness of the transparent organic medium layer to be the target thickness. Hereinafter, the particles will be referred to as "layer thickness control particles". The resulting structure obtained in accordance with the above-described method is schematically illustrated in FIG. 16.

The layer thickness control can also be possible by filling the transparent organic medium in a state of being mixed with the layer thickness control particles.

In addition, a photo-curable resin monomer, in which a pigment having absorption anisotropy is dissolved, may be contained in the transparent organic medium layer. After the monomer is cured in accordance with irradiation of light polarized by a polarizer, the pigment has a light absorption axis. In this case, accordingly, the transparent organic medium layer can function as an auxiliary polarizing plate. In this case, it is also possible to reduce leakage of light during a black display of the liquid crystals.

Since the pigment used in the color filter scatters light emitted from the light source, the scattered light may be leaked during the black display. For this reason, there may be a problem of a degradation in contrast. Such a contrast degradation can be reduced when a pigment functioning to absorb scattered light is contained in the transparent organic medium layer. When black is displayed in the liquid crystal display, the color tone thereof inclines to blue. This is because the light leakage in a wavelength range of 400 to 450 nm is larger than those in other wavelength ranges. Accordingly, when a pigment capable of absorbing light of 400 to 450 nm is contained in the transparent organic medium layer, it is possible to reduce the inclination of the color tone to blue during the black display, and thus, to more distinctly display black. The present invention is not limited to the pigment. Inorganic or metal nano-particles have a light absorption effect according to a quantum size effect thereof.

(6) Anti-Reflecting Membrane

Since the anti-reflecting membrane is arranged at the outermost surface portion of the image display surface of the liquid crystal display, it is preferred that the anti-reflecting membrane have high wear resistance. Accordingly, it is preferred that the anti-reflecting membrane be made of an inorganic material, rather than an organic material. Also, since the anti-reflecting membrane is exposed to air, it is preferred that the anti-reflecting membrane be made of a material that is difficult to be oxidized by oxygen, or a material which has already been oxidized.

In the case of an anti-reflecting membrane having a multilayer structure, it is formed using a combination of a zirconium oxide having a high refractive index (on the order of about 2.1), a magnesium fluoride having a low refractive index (about 1.38), and a silicon oxide having, a refractive index ranging between the reflective indexes (on the order of about 1.5). In this case, there is an advantage that in practice the anti-reflecting membrane has high wear resistance because it has a high pencil hardness of 8 to 9H where the front plate is made of glass.

In the case of an anti-reflecting membrane having a single-layer structure, it should have a refractive index lower than that of the base plate associated therewith. It is preferred that this membrane be made of an inorganic oxide having a high pencil hardness. In particular, examples of a preferred inorganic oxide include a silicon oxide having a relatively low refractive index, and a silicon oxide having a matrix of a silicon compound having a hydrolysable residue while having pores formed therein. Of these silicon oxides, a silica sol is more preferable. In this case, the anti-reflecting membrane is formed in accordance with the following method. First, fine silicon oxide particles and silica sol are dispersed and dissolved in water or an alcohol-based solvent. The resulting mixture, namely, a paint 27 for formation of the anti-reflecting membrane, is coated over the front plate, and then rapidly heated. As a result, the solvent is rapidly evaporated, thereby causing bubbles 28 to be formed in the coating. In this state, the coating is completely solidified. Thus, an anti-reflecting membrane 30, in which pores 29 are present, is formed. This process is schematically illustrated in FIG. 17.

Figure 18:
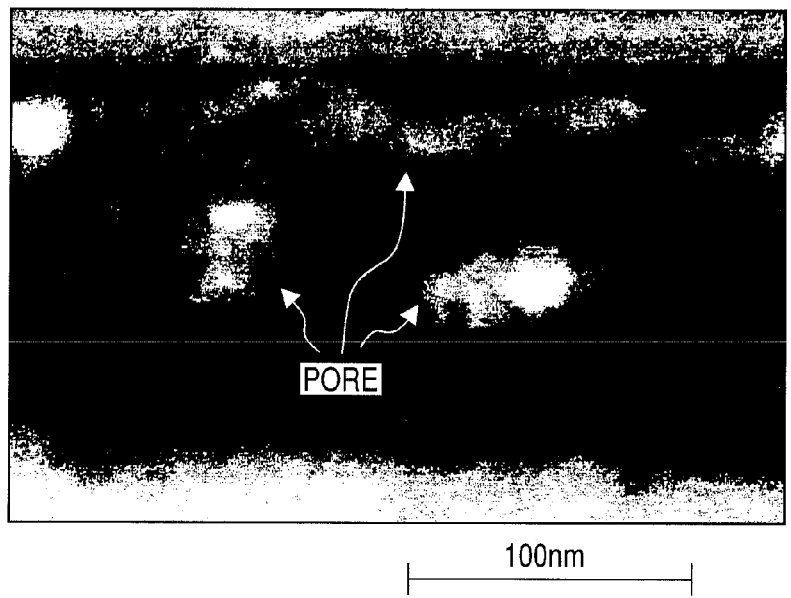
FIG. 18 is a photograph showing the cross-section of the anti-reflecting membrane used in the present invention.

FIG. 18 shows a photograph of a cross-section of the anti-reflecting membrane used in the present invention.

The base plate is an acrylic plate. A carbon layer is formed on the base plate. Here, the carbon layer is formed to prevent a cross-section sample from being broken during preparation thereof for a measurement to be carried out for the cross-section. The effects of the present invention can still be achieved even when the carbon layer is not formed.

Figure 17:
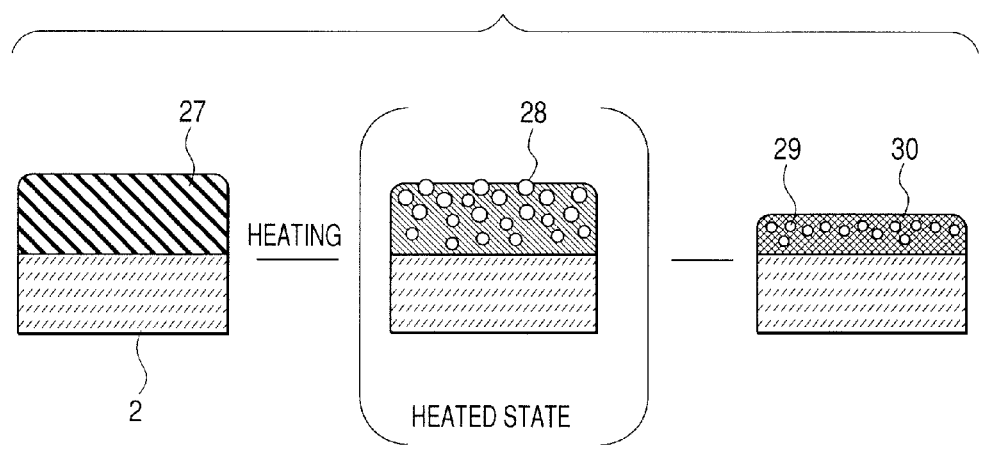
FIG. 17 is a schematic view illustrating a method for forming an anti-reflecting membrane used in the present invention.

Referring to FIG. 17, it can be seen that several pores are present in the anti-reflecting membrane used in the present invention. By virtue of the pores, the refractive index of the membrane is lower than the refractive index of a general silicon oxide, namely, about 1.5. As the content of fine silicon oxide particles is increased, the refractive index of the membrane is likely to be reduced.

The shape of the pores is irregular. Accordingly, the size of the pores can be seen to be about 5 to 150 nm when the pores are observed along the longer axis thereof. In order to identify the pores, an element presence strength measurement was performed for portions with pores and portions without pores. The results of the measurement are described in FIG. 19.

Figure 19:
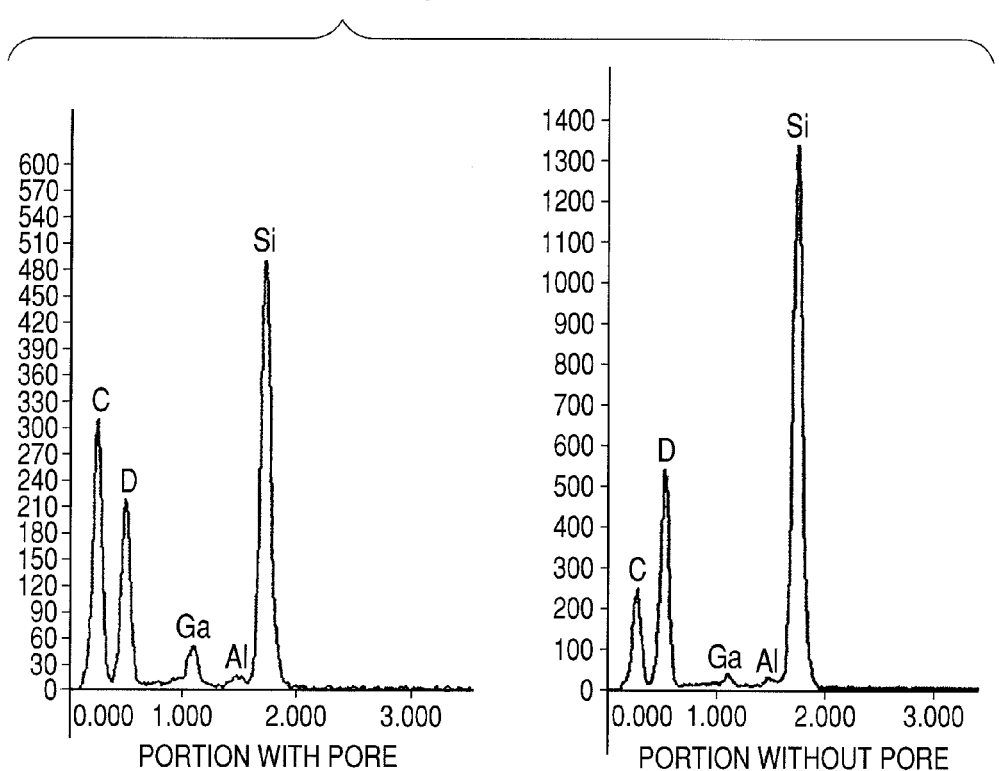
FIG. 19 illustrates graphs of element presence strengths of the anti-reflecting membrane used in the present invention.

Referring to FIG. 19, it can be seen that the portions with pores exhibit low element presence strengths for carbon, oxygen, silicon, etc., as compared to the portions without pores. Based on the element present strengths, accordingly, it is possible to identify presence of pores. The refractive index of the anti-reflecting membrane can be controlled by varying the rate of the matrix of the membrane, namely, the silicon oxide (refractive index of about 1.5) present in the membrane, and rate of the pores (refractive index of about 1.0) present in the membrane. More particularly, as the rate of the pores is increased, the refractive index of the membrane is reduced. Since the evaporation of the solvent in the coating carried out during the thermosetting of the coating contributes to the formation of pores, it is also possible to control the formation of pores in accordance with the boiling point of the used solvent and the temperature of the thermosetting carried out after coating of the paint over the base plate. Referring to FIG. 8, the above-described tendency can be seen. That is, the pores are more densely formed in a relatively upper portion (portion near the outermost surface) of the anti-reflecting membrane. It is considered that this tendency results from the fact that bubbles, which start to be formed within the paint on the base plate, rise to a region in the vicinity of the surface of the paint in accordance with thermosetting, namely, heating. When anti-reflecting membranes having different thicknesses are formed using paints having the same composition, respectively, the thinner membrane will exhibit a lower refractive index under the same thermosetting condition, by virtue of the above-described tendency. That is, this is because pores are likely to be formed in a region in the vicinity of the surface of the anti-reflecting membrane. In order to densely form pores not only in the region in the vicinity of the surface of the anti-reflecting membrane, but also in the inner portion of the anti-reflecting membrane, a method may be used in which the anti-reflecting membrane is formed to have a double-layer structure. In accordance with this method, it is possible to further enhance the physical strength of the membrane because pores are formed not only in the region in the vicinity of the surface of the membrane, but also in the inner portion of the membrane.

In the above description, the method for forming the anti-reflecting membrane using a silica sol as a silicon compound having a hydrolysable residue has been proposed. The silica sol is transformed into silicon oxide while being heated. The formed silicon oxide exhibits a high light transmittance because it has a high transparency. Examples of tetraalkoxy silane used to form a silica sol include tetramethoxy silane, tetraethoxy silane, tetrapropoxy silane, tetra iso-propoxy silane, tetra iso-butoxy silane, and tetrabuthoxy silane. In place of alkoxy silane, a silicon compound having a chloro group, for example, a silicon tetrachloride, may be used.

Examples of a silicon compound having a hydrolysable residue, other than the silica sol, include compounds having an amino, chloro or mercapto group, other than tetra alkoxy silane. More particularly, they include 3-aminopropyl triethoxysilane, 3-aminopropyl trimethoxy silane, N-(2-aminoethyl)-3-aminopropyl trimethoxysilane, 3-chloropropyl trimethoxy silane, 3-chloropropyl methydimethoxy silane, 3-mercaptopropyl trimethoxy silane, vinyltrimethoxy silane, vinyltriethoxy silane, 3-glycidylpropyl trimethoxy silane, 3-glycidylpropyl methyldimethoxy silane, and 3-methacryloxypropyl trimethoxy silane.

Examples of fine inorganic oxide particles include colorless or white fine particles of silicon, aluminum, titanium and cerium oxides. As to the size of the particles, it is preferred that the shorter axis of the particles be not more than the average thickness of the membrane, for an improvement in the evenness of the membrane. Of the above-described oxides, a silicon oxide (refractive index of about 1.5 to 1.7 and an aluminum oxide (refractive index of about 1.7 to 1.9), which have a relatively low refractive index, are preferable in that it is possible to more easily obtain a membrane having a low refractive index. In particular, fine silicon oxide particles having a low refractive index are more preferable.

When the fine silicon oxide particles are spherical, they preferably have an average particle size of 190 nm or less, in order to prevent scattering of visible light (wavelength of 380 to 760 nm) incident to the membrane. When larger particles are used, the membrane may be dim because of possible scattering of incident light. In this case, application of the membrane to displays may be unsuitable. Also, when the fine silicon oxide particles have a chain shape, they preferably have a thickness of 190 nm for the same reason as the above. In addition, an improvement in transparency is achieved at a smaller diameter of the fine silicon oxide particles. For this reason, the average diameter of the particles is preferred to be 100 nm or less. In the present invention, the lower limit size of the fine silicon oxide particles is about 9 nm, taking into consideration commercially available sizes. However, particles of lower sizes may be used, as long as they are well dispersed in the membrane.

Preferably, the target membrane thickness set in the formation of the anti-reflecting membrane is 60 to 190 nm. Theoretically, a minimum reflectance is obtained under the condition of "$t=\lambda/4n$" when it is assumed that "$\lambda$" is the wavelength of incident light, and "n" is the refractive index of a medium (transparent plate, or anti-reflecting membrane of the present invention), which the incident light enters.

When incident light is visible light (wavelength: 380 to 760 nm), and a material having a refractive index in a range from that of air (refractive index of about 1.0) as a medium to that of the transparent glass plate of relatively high refractive index (about 1.7) is used for the membrane, it is preferred that the minimum thickness of the membrane be 56 nm (380/(4× 1.7)=56). At a membrane thickness of less than 56 nm, the membrane cannot sufficiently affect reflectance when the incident light has a wavelength in the visible range. Accordingly, it is preferable to set the target minimum thickness at 60 nm, which is slightly larger than 56 nm, taking into consideration the membrane thickness distribution in the formation of the coating. On the other hand, it is preferred that the maximum thickness of the membrane be 190 nm (760/(4× 1.0)=190). Based on the above conditions, it is considered that the thickness of the membrane of the present invention is preferably in a range from 60 to 190 nm.

(7) Liquid Repellent Layer

The anti-reflecting membrane, which is used in the present invention, is formed in accordance with thermosetting. The will have an improved fouling resistance when being coated with a fluorine compound having liquid repellency. However, the layer of a fluoride having liquid repellency should be sufficiently thin, in order to prevent a deterioration in the anti-reflecting effect of the membrane. More particularly, when the thickness of the liquid-repellent layer is 56 nm or less, it is possible to eliminate adverse effects on reflectance, as described above in conjunction with the thickness of the anti-reflecting membrane.

The layer of the fluoride having liquid repellency may be formed by one of the following two methods.

(A) Coating Made of Fluoride Having Liquid Repellency

This method forms a coating made of a fluoride having liquid repellency. The coated membrane exhibits liquid repellency by virtue of the coating. However, the coating exhibits high resistance, thereby causing the surface resistance of the anti-reflecting membrane to be increased. As a result, dust or the like may be easily attached to the anti-reflecting membrane. Furthermore, a degradation in wear resistance may possibly occur because the pencil hardness of the surface of the membrane depends on the hardness of the liquid-repellent coating (lower than that of silicon oxide). Examples of materials useful for forming the liquid-repellent layer include CYTOP (the product of Asahi Glass Company) and INT304VC (the product of INT MATERIAL Co., Ltd.). Each of these materials is diluted with a solvent, coated on a plate, and then heated to volatilize the solvent, in order to form a liquid-repellent coating. The coating may be formed using a thermosetting process, depending on circumstances.

(B) Binding of Perfluoropolyether Compound or Perfluoroalkyl Compound

This method binds, to the anti-reflecting film, a perfluoropolyether or perfluoroalkyl compound having an alkoxy silane group able to be bound to a hydroxyl group at a terminal thereof. More specifically, the compounds represented by Formula 1 can be bound to the anti-reflecting membrane.

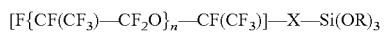

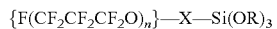

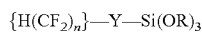

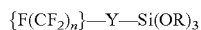 (Formula 1)

wherein, X is a site at which a perfluoropolyether chain and an alkoxy silane residue are bound to each other, Y is a site at which a perfluoroalkyl chain and an alkoxy silane residue are bound to each other, and R is an alkyl group.

In this case, the used compounds do not completely cover the anti-reflecting membrane surface. Perfluoropolyether chains or perfluoroalkyl chains are distributed in places on the anti-reflecting membrane, like grass growing on the ground. Since the compounds are incompletely coated on the surface of the anti-reflecting membrane, the resistance of the anti-reflecting membrane is not increased even after the coating of the compounds. Also, it is possible to prevent a degradation in the pencil hardness of the membrane.

In accordance with the formation of perfluoropolyether or perfluoroalkyl chains on the surface of the membrane, an improvement in the lubricity of the membrane surface is achieved. Accordingly, the membrane can have a surface capable of reducing wear-caused physical damages thereon, and exhibiting high wear resistance.

As apparent from the above description, it is advantageous to use the method using a perfluoropolyether or perfluoroalkyl compound having an alkoxy silane group at a terminal thereof, for formation of a liquid-repellent layer, because it is possible to maintain the membrane surface at low resistance, and to improve the wear resistance of the membrane surface, in addition to fouling resistance. Hereinafter, a liquid-repellent agent and a method for forming a liquid-repellent film will be described.

(a) Liquid-Repellent Agent

In particular, examples of the perfluoropolyether or perfluoroalkyl compound having an alkoxy silane group at a terminal thereof include the following Compounds 1 to 12:

$$F\{CF(CF_3)-CF_2O\}_n-CF(CF_3)-CONH-(CH_2)_3-Si(OCH_2CH_3)_3 \quad \text{(Formula 2)}$$

$$F\{CF(CF_3)-CF_2O\}_n-CF(CF_3)-CONH-(CH_2)_3-Si(OCH_3)_3 \quad \text{(Formula 3)}$$

$$F\{CF_2CF_2CF_2O\}_n-CF_2CF_2-CONH-(CH_2)_3-Si(OCH_2OCH_3)_3 \quad \text{(Formula 4)}$$

$$F\{CF_2CF_2CF_2O\}_n-CF_2CF_2-CONH-(CH_2)_3-Si(OCH_3)_3 \quad \text{(Formula 5)}$$

$$H(CF_2)_6-CONH-(CH_2)_3-Si(OCH_2OCH_3)_3 \quad \text{(Formula 6)}$$

$$H(CF_2)_6-CONH-(CH_2)_3-Si(OCH_3)_3 \quad \text{(Formula 7)}$$

$$H(CF_2)_8-CONH-(CH_2)_3-Si(OCH_2OCH_3)_3 \quad \text{(Formula 8)}$$

$$H(CF_2)_8-CONH-(CH_2)_3-Si(OCH_3)_3 \quad \text{(Formula 9)}$$

$$F(CF_2)_6-(CH_2)_2-Si(OCH_3)_3 \quad \text{(Formula 10)}$$

$$F(CF_2)_8-(CH_2)_2-Si(OCH_3)_3 \quad \text{(Formula 11)}$$

$$F(CF_2)_6-(CH_2)_2-Si(OCH_2OCH_3)_3 \quad \text{(Formula 12)}$$

$$F(CF_2)_8-(CH_2)_2-Si(OCH_2OCH_3)_3 \quad \text{(Formula 13)}$$

Of these, Compounds 1 to 8 can be produced by synthesizing methods which will be described below. Compounds 9 to 12 are commercially available from Hydrus Chemical as 1H,1H,2H,2H-perfluorooctyltrimethoxy silane, 1H,1H,2H,2H-perfluorooctyltriethoxy silane, 1H,1H,2H,2H-perfluorodecyltrimethoxy silane, 1H,1H,2H,2H-perfluorodecyltriethoxy silane, respectively. Daikin Industries' OPTOOL DSX is another commercially-available product. Each of Compounds 1 to 4 has a fluorine chain which is perfluoropolyether. The liquid-repellent film formed of the compound having the fluorine chain exhibits little deterioration in liquid repellency (by 5° or less) even when immersed in a liquid other than water, for example, engine oil or gasoline, for a prolonged period of time (1,000 hours). The liquid-repellent film is also advantageous in terms of fouling resistance. These compounds are represented by the following general formula:

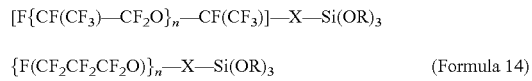

$$\{F(CF_2CF_2CF_2O)\}_n-X-Si(OR)_3 \quad \text{(Formula 14)}$$

wherein, X is a site at which a perfluoropolyether chain and an alkoxy silane residue are bound to each other, and R is an alkyl group.

When Compounds 5 to 12 are immersed in engine oil or gasoline for a prolonged period of time (1,000 hours), they show a contact angle decreased from a contact angle before immersion (about 110°) to almost the contact angle of the base plate.

(Synthesis of Compound 1)

First, DuPont's Krytox 157 FS-L (average molecular weight of 2,500) (25 parts by weight) was dissolved in 3M's PF-5080 (100 parts by weight), to which thionyl chloride (20 parts by weight) was added. The resulting mixture was heated under reflux for 48 hours while being stirred. The thionyl chloride and PF-5080 were then removed by an evaporator, to produce acid chloride of Krytox 157FS-L (25 parts by weight). To the product, PF-5080 (100 parts by weight), Chisso's Sila-Ace S330 (3 parts by weight), and triethyl amine (3 parts by weight) were added. The resulting mixture was stirred at room temperature for 20 hours. The reaction solution was filtered with a Showa Chemical Industry's filtration aid RADIOLITE FINE FLOW A, and PF-5080 was removed from the filtrate by an evaporator, to produce Compound 1 (20 parts by weight).

(Synthesis of Compound 2)

Compound 2 (20 parts by weight) was produced in accordance with the same synthesis as that of Compound 1, except that Chisso's Sila-Ace 5330 (3 parts by weight) was replaced by Chisso's Sila-Ace 5360 (3 parts by weight).

(Synthesis of Compound 3)

Compound 3 (30 parts by weight) was produced in accordance with the same synthesis as that of Compound 1, except that DuPont's Krytox 157FS-L (average molecular weight of 2,500) (25 parts by weight) was replaced by Daikin Industries' DEMNUM SH (average molecular weight of 3,500) (35 parts by weight).

(Synthesis of Compound 4)

Compound 4 (30 parts by weight) was produced in accordance with the same synthesis as that of Compound 1, except that Chisso's Sila-Ace 5330 (3 parts by weight) was replaced by Chisso's Sila-Ace S360 (3 parts by weight) and DuPont's Krytox 157FS-L (average molecular weight of 2,500) (25 parts by weight) was replaced by Daikin Industries' DEMNUM SH (average molecular weight of 3,500) (35 parts by weight).

(Synthesis of Compound 5)

Compound 5 (3.5 parts by weight) was produced in accordance with the same synthesis as that of Compound 1, except that DuPont's Krytox 157FS-L (average molecular weight of 2,500) (25 parts by weight) was replaced by Daikin Industries' 7H-dodecafluoroheptanoic acid (average molecular weight of 346.06) (3.5 parts by weight).

(Synthesis of Compound 6)

Compound 6 (3.5 parts by weight) was produced in accordance with the same synthesis as that of Compound 1, except that DuPont's Krytox 157FS-L (average molecular weight of 2,500) (25 parts by weight) was replaced by Daikin Industries' 7H-dodecafluoroheptanoic acid (average molecular weight of 346.06) (3.5 parts by weight) and Chisso's Sila-Ace 5330 (2 parts by weight) was replaced by Chisso's Sila-Ace 5320 (2 parts by weight).

(Synthesis of Compound 7)

Compound 7 (4.5 parts by weight) was produced in accordance with the same synthesis as that of Compound 1, except that DuPont's Krytox 157FS-L (average molecular weight of 2,500) (25 parts by weight) was replaced by Daikin Industries' 9H-hexadecafluorononanoic acid (average molecular weight of 446.07) (4.5 parts by weight).

(Synthesis of Compound 8)

Compound 8 (4.5 parts by weight) was produced in accordance with the same synthesis as that of Compound 1, except that DuPont's Krytox 157FS-L (average molecular weight of 2,500) (25 parts by weight) was replaced by Daikin Industries' Daikin Industries' 9H-hexadecafluorononanoic acid (average molecular weight of 446.07) (4.5 parts by weight) and Chisso's Sila-Ace 5330 (2 parts by weight) was replaced by Chisso's Sila-Ace 5320 (2 parts by weight).

(b) Method for Forming Liquid-Repellent Film

The method for forming a liquid-repellent film using a perfluoropolyether or perfluoroalkyl compound having an alkoxy silane group at a terminal thereof will be described.

First, a perfluoropolyether or perfluoroalkyl compound having an alkoxy silane group at a terminal thereof is dissolved in a solvent. The concentration of the resulting solution is generally in a range from about 0.01 to 1.0% by weight, even though it depends on the coating method used. The alkoxy silane group is gradually hydrolyzed by water in the solvent, or even by moisture absorbed from air into the solvent. Accordingly, it is preferable to dehydrate the solvent, or to select a solvent that is difficult to dissolve in water, such as a fluorine-based solvent. Examples of the fluorine-based solvent include 3M's FC-72, FC-77, PF-5060, PF-5080, HFE-7100 and HFE-7200, and DuPont's Vertrel XF. Thus, a solution, in which the perfluoropolyether or perfluoroalkyl compound is dissolved, is prepared (Hereinafter, the solution will be referred to as a "liquid-repellent agent".).

Thereafter, the liquid-repellent agent is coated on the anti-reflecting membrane. The coating is carried out using a general coating method, for example, dip coating or spin coating. Next, heating is performed. The heating is required to enable the alkoxy silane residue to be bound to the hydroxyl group on the membrane surface. Typically, the heating is carried out at 120° C. for about 10 minutes, or at 100° C. for about 30 minutes. At 90° C., the heating is carried out for about 1 hour. Although the heating may be carried out at normal temperature, a considerable time is required in this case.

Finally, the membrane surface is rinsed using a fluorine-based solvent, to remove the surplus liquid-repellent agent. Thus, the liquid-repelling treatment is completed. For the solvent used in the rinsing process, solvents proposed in the description of the liquid-repellent agent may be used.

The present invention is described in detail through examples. However, it is to be understood that scope of the present is not limited to the examples.

EXAMPLE 1

Three sheets of liquid crystal modules each having a structure, in which a polarizing plate, a liquid crystal cell, and another polarizing plate are arranged over a backlight unit in an overlapped manner, were prepared. On one sheet, a glass plate having a thickness of 2 mm was provided, as a front plate, such that a layer of polyisobutylene as a transparent organic medium is interposed between the liquid crystal module and the glass plate. The polyisobutylene has a thickness of about 1 mm. On another sheet, the same glass plate was provided, without filling of polyisobutylene, such that an air layer is interposed between the liquid crystal module and the glass plate. The liquid crystal module of the remaining one sheet was maintained as it is.

After measurement of pencil hardness at a load of 1 Kg for the surfaces of the modules, the modules having the front plate were not scratched by a 2H pencil, but the module having no front plate was scratched by the 2H pencil. Accordingly, it was seen that it is possible to secure a pencil hardness of 2H, and to achieve an improvement in wear resistance by providing the front plate. Measurement of pencil hardness for the cases provided with the front plate using a pencil of a higher hardness showed that either the case provided with the transparent organic medium or the case provided with no transparent organic medium exhibits a pencil hardness of 9H or more.

Comparison between the modules each having the front plate showed that the case filled with no polyisobutylene exhibits increased reflection at the surface thereof. In detail, the case filled with no polyisobutylene was measured to have a reflectance of about 8%, whereas the case filled with polyisobutylene was measured to have a reflectance of about 4%. Accordingly, it was seen that it is possible to reduce reflection by filling polyisobutylene in the gap defined between the front plate and the polarizing plate.

Both cases, in which respective polyisobutylene layers were formed to have thicknesses of about 0.1 mm and about 10 mm, exhibit a reflectance of about 4%.

EXAMPLE 2

Three sheets of liquid crystal modules each having a structure, in which a polarizing plate, a liquid crystal cell, and another polarizing plate are arranged over a backlight unit in an overlapped manner, were prepared. Thereafter, a controller, a power supply unit, etc. were mounted to each liquid crystal module, to manufacture a liquid crystal display as an image display device. In two of the three sets, a driver IC for controlling LCD was mounted beneath the liquid crystal cell. In the remaining one set, the driver IC for controlling LCD was mounted over the liquid crystal cell. In one of the sets, in which the driver IC for controlling LCD was mounted beneath the liquid crystal cell, a glass plate having a thickness of 2 mm was provided, as a front plate, such that a layer of polyisobutylene as a transparent organic medium is interposed between the liquid crystal display and the glass plate. The polyisobutylene has a thickness of about 1 mm.

The three liquid crystal display sets were continuously used for 3 hours in a room at 40° C. As a result, dimming of an image occurred in the vicinity of a region where the driver IC for controlling LCD was mounted, in the liquid crystal display in which the driver IC for controlling LCD was mounted over the liquid crystal cell.

During operation of the liquid crystal display, heat from the backlight heats the interior of the liquid crystal display. In particular, the upper portion of the liquid crystal display is more intensively heated. The driver IC for controlling LCD is also heated, and the heat from the driver IC for controlling LCD is transferred to the liquid crystal cell. In the case of the liquid crystal display, in which the driver IC for controlling LCD is mounted over the liquid crystal cell, the liquid crystals of the liquid crystal cells are heated to around the operational temperature thereof by the heat transferred from the driver IC for controlling LCD to the liquid crystal cell. As a result, the liquid crystals cannot exhibit liquid crystal characteristics. It is considered that the above-described image dimming was caused by such a phenomenon.

In order to remove dust on the screen of each liquid crystal display, a weak-alkaline glass cleaner was sprayed on the screen, and the screen was then wiped using a duster. As a result, in the liquid crystal display, in which the driver IC for controlling LCD was set beneath the liquid crystal set, and no front plate was provided, the screen could partially not display an image. On the other hand, such a phenomenon did not occur in the remaining two sets. After investigation, it could be seen that the glass cleaner sprayed on the screen reached the driver IC for controlling LCD via a gap defined between the polarizing plate and the frame, and wetted the driver IC for controlling LCD. It is considered that, due to such a phenomenon, the circuit wiring of the driver IC for controlling LCD was short-circuited, so that the screen could partially not display an image. The same phenomenon occurred when water mixed with a detergent was used in place of the glass cleaner.

Thus, it could be seen that the liquid crystal display, in which the driver IC for controlling LCD was set beneath the liquid crystal set, and the front plate was provided, was preferable, in order to prevent the liquid crystal display from exhibiting an image dimming phenomenon even after being used for a prolonged period of time in a high-temperature room, and to enable the liquid crystal display to have a liquid tightness capable of allowing the liquid crystal display to withstand screen cleaning using a liquid such as a glass cleaner or a detergent-mixed liquid.

EXAMPLE 3

Measurement of pencil hardness and reflectance was performed in the same manner as that of Example 1, except that a double-sided tape having a width of 6 mm and a thickness of 1 mm was attached to the polarizing plate near the ends of the polarizing plate, to define a bank for the transparent organic medium, and tri-ethylene glycol was filled as the transparent organic medium. After the measurement, it was seen that the cases using the front plate exhibited a pencil hardness of 9H or more, and the case filled with tri-ethylene glycol exhibited a reflectance of about 4%.

EXAMPLE 4

First, a method for forming an anti-reflecting membrane on the front plate will be described.
(1) Preparation of Anti-reflecting Paint
A paint for forming an anti-reflecting membrane (hereinafter, referred to as an "anti-reflecting paint") was prepared by mixing a silica sol solution (kept acidic with phosphoric acid, and containing a solvent of water:ethanol (=1:4) and an alkoxy silane polymer (2.5% by weight)) (3 parts by weight) as a binder and a silicon oxide dispersion (having a particle size of 10 to 30 nm, and containing solids at 10% by weight) (12 parts by weight) as fine inorganic oxide particles with ethanol (60 parts by weight). The prepared paint had a boiling point of 80° C.
(2) Formation of Anti-reflecting Membrane
The paint was coated over the front plate, namely, the glass plate having a thickness of 2 mm, using a spin coating process.
Immediately after the coating, the glass plate was put into a constant-temperature bath kept at 160° C., and then was heated for 10 minutes. As a result, the silica sol was transformed into silicon oxide. Thus, thermosetting of the paint was completed. Accordingly, formation of an anti-reflecting membrane on the surface of the glass plate was completed.
(3) Optical Evaluation Test
After measurement of the thickness and refractive index of the anti-reflecting membrane formed on the glass plate, it was seen that the thickness was 120 nm, and the refractive index was 1.33. Also, the luminous reflectance of the surface, on which the anti-reflecting membrane was formed, was measured to be 1.5%. The thickness and refractive index measurement was performed using an ellipsometer manufactured by Mizoziri Kogaku Kogyo (Model: DHA-OLK). The glass plate coated with no anti-reflecting membrane exhibited a reflectance of about 4% at each surface thereof. Accordingly, it could be seen that the membrane of the present invention had an anti-reflecting function.
After observing the cross-section of the formed anti-reflecting membrane in accordance with a TEM analysis, pores having a size of 5 to 150 nm were found in the anti-reflecting membrane, as shown in FIG. 18.
(4) Manufacture of Liquid Crystal Display
A liquid crystal display, in which polyisobuthylene was used as a transparent organic medium, was manufactured in the same manner as that of Example 1, except that the front plate formed with the above-described anti-reflecting film was used.
(5) Evaluation of Pencil Hardness, Etc.
After performing measurement of pencil hardness in the same manner as that of Example 1, it was seen that the front plate provided with the anti-reflecting membrane had a pencil hardness of 6H, which was an improvement over the case provided with no front plate, namely, the case in which the outermost surface thereof is the polarizing plate (H).
A reflectance of 1.5% was measured. Accordingly, it was seen that the reflectance reduction effect was improved over the case provided with no front plate.

EXAMPLE 5

Anti-reflecting membranes were formed on both surfaces of the front plate, respectively, in the same manner as that of Example 4, except that the formation of the anti-reflecting membranes were performed using a dip coating process, in place of the spin coating process. Using the resulting front plate, a liquid crystal display was manufactured under the condition in which polyisobuthylene was used as a transparent organic medium, as in Example 4. The case, in which anti-reflecting membranes were provided at both surfaces of the front plate, exhibited a considerably reduced rate of generation of bubbles and easy manufacture, as compared to cases other than the above-described case. It is considered that this is because the anti-reflecting membranes have pores therein, and thus, have an improved hydrophilicity, thereby enabling a filling process involving no generation of bubbles.
In the case using the front plate provided with anti-reflecting membranes at both surfaces thereof, accordingly, easy manufacture of the liquid crystal display was confirmed.

EXAMPLE 6

An anti-reflecting paint was prepared in the same manner as that of Example 5, except that N-(2-aminoethyl)-3-aminopropyltriethoxy silane (Chisso's Sila-Ace S320) (0.1 parts by weight) was used in place of the silica sol solution (3 parts by weight). Using this paint, anti-reflecting membranes were formed on the front plate. Thereafter, a liquid crystal display was manufactured in the same manner as that of Example 1, using the resulting front plate, under the condition in which polyisobuthylene was used as a transparent organic medium.
The display exhibited a pencil hardness of 4H at the image display surface thereof, and a surface reflectance of 1.6% Thus, the display was confirmed to have high wear resistance, as compared to conventional cases.

EXAMPLE 7

This example is identical to Example 1, except that a solution of monomer of photo-curable acrylic resin containing 0.1% of a pigment NK 3981 (manufactured by Hayashibara Biochemical Laboratories) was used for the transparent organic medium, which is interposed between the polarizing plate arranged at the side of the observer of the liquid crystal panel and the front plate formed with the anti-reflecting film at the side of the observer. The acrylic resin monomer was cured in accordance with irradiation of light of 365 nm thereto using a high-voltage mercury lamp.
In this example, the transparent organic medium functions as an absorption layer having an absorption peak in the vicinity of a wavelength of 490 nm by virtue of the effect of the pigment contained in the transparent organic medium. Accordingly, an improvement in contrast ratio can be expected.
The color filter used in the liquid crystal panel is formed with colored layers of blue, green, and red, using organic pigments. For example, PB15:6+PV23 is known for blue, PG36+PY150 is known for green, and Pr177+PY83 is known for red. The organic pigments have a particle size of about 50 to 200 nm, and are present in a base polymer in a dispersed state. However, they are of a particle system in a Rayleigh scattering range. For this reason, the organic pigments scatter incident light from a light source arranged at the back surface of the liquid crystal panel. The scattered light causes light leakage, thereby resulting in a degradation in contrast ratio. In the liquid crystal display, this phenomenon is more serious in that the light incident to the liquid crystal panel is not parallel light, but diffused light, because the liquid crystal panel has viewing angle properties.

Since the scattered light of the color filter is caused by Rayleigh scattering, it has a peak at a wavelength shorter than the intrinsic spectral characteristics thereof. In particular, in the green filter, the peak wavelength thereof is shifted to a shorter wavelength, namely, from 530 nm to around 490 nm. The shifted peak wavelength is within the wavelength range of light emitted from the light source. The shifted peak wavelength is also within a wavelength range exhibiting a relatively high luminous sensitivity. For example, in the case of a light source using narrow-band light emitting phosphors, sub light emitted from green phosphors is present in the vicinity of 490 nm. In the case of a light emitting diode, the peak of the light emitted from the light emitting diode does not correspond to the wavelength of 490 nm. However, the wavelength of 490 nm is within the light emitting range of a blue or green light emitting diode. That is, light of 490 nm is unusually strengthened in a black display.

In this example, the function for absorbing light of around 490 nm is provided to the transparent organic medium. In accordance with this function, it is possible to absorb unnecessary light of around 490 nm unusually pronounced in a black display. On the other hand, in a white display, the intensity of light around 490 nm is very weak. Accordingly, although light of this wavelength is absorbed, a contrast ratio improvement effect can be obtained because there is no serious affect on the intensity of light transmitted in a white display. In this example, it was possible to reduce the black-level transmittance by 13%, and to improve the contrast ratio by 10% in accordance with the addition of the pigment in an amount of 0.1 wt %.

In order to enable the transparent organic medium to function as an absorption layer, a pigment is preferable which has an absorption peak in the vicinity of 490 nm, and can be dispersed in the transparent organic medium. Of course, the pigment is not limited to this example. The addition amount of the pigment can be appropriately optimized, taking into consideration the absorbance of the used pigment, the black-level transmittance, and the white-level transmittance.

EXAMPLE 8

This embodiment is identical to Example 6, except that the transparent organic medium was replaced by a photo-curable acrylic resin added with 0.2 wt % of metal nano-particles. In this example, it is possible to absorb unusual components of scattered light in the vicinity of about 490 nm by the pigment of the color filter during a black display, and thus, to achieve an improvement in contrast ratio. It is also possible to uniformly disperse the metal nano-particles in the organic medium by surface-treating the metal nano-particles, using a surfactant, to prevent cohesion of the nano-particles. In this example, 0.2 wt % of gold nano-particles having a particle size of 10 nm or less, surface-treated by a surfactant, for example, an acrylic and mercapto group containing long hydrocarbon compound, was added to and mixed with the resin. As a result, it was possible to reduce the black-level transmittance by 10%, and thus, to improve the contrast ratio by 8%.

For the metal nano-particles, various metal nano-particles may be used, as long as they have an absorption peak in the vicinity of 490 nm, and can be uniformly dispersed in the organic medium after surface treatment thereof. Nano-particles made of an alloy of various metals may also be used. Of course, the metal nano-particles are not limited to this example. The addition amount of the nano-particles can be appropriately optimized, taking into consideration the absorption coefficient of the used particles, the black-level transmittance, and the white-level transmittance.

EXAMPLE 9

This example is identical to Example 7, except that the transparent organic medium was replaced by a photo-curable acrylic resin added with 0.1 wt % of 4-carboxymethyl azobenzene, and the light irradiation process for photo-curing was replaced by another one. In order to develop an absorption anisotropy before photo-curing the acrylic resin, a high-voltage mercury lamp was used as the light source. Using an interference filter, i-rays of 365 nm were obtained. The i-rays were then irradiated to the base plate with irradiation energy of about 5 J/cm2, in the form of linear polarized light having a polarization ratio of about 10:1, using a pile polarizer having a laminate of quartz plates. The polarization direction of the irradiated polarized light corresponded to the shorter-side direction of the base plate. Thereafter, ultraviolet rays in a range of 250 to 450 nm were irradiated to the entire surface of the base plate, in order to photo-cure the transparent organic medium, namely, the acrylic resin. The two rays may be irradiated in a merged state. In accordance with the irradiation of the rays, the transparent organic medium developed an absorption axis in the longer-side direction of the base plate. This is because the developed absorption axis should extend in the same direction as the absorption axis of the polarizing plate on the front surface of the liquid crystal panel used in this example, namely, the polarizing plate arranged at the side of the observer. When the absorption axis of the front polarizing plate of the used liquid crystal panel extends in a shorter-side direction, the polarization plane of the irradiated polarized light is changed to correspond to the longer-side direction of the base plate. In this example, a material was used which causes development of an absorption axis in a direction orthogonal to the polarization direction of the irradiated polarized light. However, where a different material is used which causes development of an absorption axis in the same direction as the polarization plane of the irradiated polarized light, for example, photo-oxidation in the polarization direction of the irradiated polarized light, the polarization direction of the irradiated polarized light may be appropriately changed. The same effect can be obtained in accordance with linear irradiation other than irradiation using the polarizer, as long as the used material is a photo-functional material capable of developing uniaxial absorption anisotropy.

The photo-functional material is not limited to the compounds in this example. The addition amount of the used photo-functional material can be appropriately optimized in accordance with the capability of the photo-functional material to develop anisotropy.

Since the transparent organic medium used in this example functions as an assistant polarizing plate for the observer-side polarizing plate, it is possible to effectively reduce light leakage in a black display, even when the developed uniaxial absorption anisotropy is slight. Accordingly, an improvement in contrast ratio can be achieved. In this example, it was possible to reduce the black-level brightness by 5%, and thus, to improve the contrast ratio by 5%.

EXAMPLE 10

This embodiment is identical to Example 8, except that the transparent organic medium was replaced by a photo-curable acrylic resin added with 0.12 wt % of DIRECT ORANGE 39. The transparent organic medium used in this example exhibits dichroism at wavelengths of 400 to 500 nm. Accordingly, in a black display, it is possible to efficiently absorb leaked light of high intensity in a short-wavelength range. Also, there is no affect on a white display. As a result, in this example, an improvement contrast ratio and correction of black-level color tones were possible. Various pigments may be added, as long as they exhibit dichroism, and can be added to the transparent organic medium.

Generally, in a liquid crystal display, the inclination of black-level color tones to blue is higher than that of white-level color tones. This is because the degree of polarization of the polarizing plate depends on wavelengths, and because light leakage is increased in a wavelength range of 400 to 450 nm. In this example, it was possible to absorb leaked light of 400 to 450 nm in a black display by the transparent organic medium containing the dichromatic pigment. Black-level color tones approximated to an achromatic color. The contrast ratio could be improved by 3%.

EXAMPLE 11

In this example, a liquid crystal display was manufactured in the same manner as that of Example 4, except that an acrylic resin plate having a thickness of 2 mm was used in place of the glass plate having a thickness of 2 mm.

As a result, the anti-reflecting membrane on the surface of the acrylic resin plate had a thickness of 115 nm and a refractive index of 1.33. Also, the luminous reflectance of the surface, on which the anti-reflecting membrane was formed, was 1.5% The acrylic resin plate coated with no anti-reflecting membrane exhibited a reflectance of about 4%. Accordingly, a reflectance reduction effect was confirmed, as compared to the front plate.

A pencil hardness of 4H was measured. That is, an improvement in hardness was exhibited, as compared to the polarizing plate (H). Also, an improvement in hardness was exhibited, as compared to the acrylic resin plate formed with no anti-reflecting membrane (2H).

The same results were obtained in the case in which a photo-curable acrylic resin is used, as the transparent organic medium, in place of polyisobuthylene. Since filling of the used photo-curable acrylic resin was carried out under the condition in which the monomer of the acrylic resin slightly dissolved the acrylic resin plate, the formation of bubbles in the transparent organic medium layer was likely to be reduced.

EXAMPLE 12

In this example, a liquid crystal display was manufactured in the same manner as that of Example 4, except that a polycarbonate plate having a thickness of 2 mm was used in place of the glass plate having a thickness of 2 mm.

As a result, the anti-reflecting membrane on the surface of the polycarbonate plate had a thickness of 115 nm and a refractive index of 1.33. Also, the luminous reflectance of the surface, on which the anti-reflecting membrane was formed, was 1.5% The polycarbonate plate coated with no anti-reflecting membrane exhibited a reflectance of about 4%. Accordingly, a reflectance reduction effect was confirmed, as compared to the front plate.

A pencil hardness of 3H was measured. That is, an improvement in hardness was exhibited, as compared to the polarizing plate (H). Also, an improvement in hardness was exhibited, as compared to the polycarbonate plate formed with no anti-reflecting membrane (2B).

The same results were obtained in the case in which a photo-curable acrylic resin is used, as the transparent organic medium, in place of polyisobuthylene. Since filling of the used photo-curable acrylic resin was carried out under the condition in which the monomer of the acrylic resin slightly dissolved the acrylic resin plate, the formation of bubbles in the transparent organic medium layer was likely to be reduced.

EXAMPLE 13

A liquid-repelling treatment was performed for the front plate formed with the anti-reflecting membrane, which was prepared in Example 4.

(1) Preparation of Liquid-Repellent Solution

First, 0.1 wt % solutions of Compounds 1 to 12 (solvent: 3M's PF-5080) were prepared as liquid-repellent solutions. The 0.1 wt % PF-5080 solution of Compound 1 is referred to as a "liquid-repellent solution [1]", the 0.1 wt % PF-5080 solution of Compound 2 is referred to as a "liquid-repellent solution [2]", . . . , and the 0.1 wt % PF-5080 solution of Compound 12 is referred to as a "liquid-repellent solution [12]".

Next, for comparison, a 0.1% PF-5080 solution of Cytop CTX-109A manufactured by ASAHI GLASS COMPANY was used as a liquid-repellent solution [13].

(2) Liquid-Repelling Treatment the case using the liquid-repellent solutions [1] to [12]

The liquid-repellent solution is coated over the front plate, using a brush. The front plate is then maintained for 30 minutes in a constant-temperature bath, the interior of which has been heated to 95° C. Thereafter, the front plate is taken out of the constant-temperature bath, and the surface of the front plate is then rinsed using PF-5080, to remove the surplus liquid-repellent solution. Thus, the treatment is completed.

the case using the liquid-repellent solution [13]

The liquid-repellent solution is coated over the front plate, using a brush. The front plate is then maintained for 90 minutes in a constant-temperature bath, the interior of which has been heated to 95° C. Thereafter, the front plate is taken out of the constant-temperature bath. Thus, the treatment is completed.

(3) Evaluation of Liquid Repellency

The liquid repellency of the base plate surface, for which the liquid-repelling treatment was completed, was evaluated, based on a water contact angle. The evaluation results are described in Table 2.

TABLE 2

| Liquid-Repelling Treatment State | | Contact Angle (°) | Surface Resistivity of Front Plate (×10$^{10}$Ω) | Pencil Hardness |
|---|---|---|---|---|
| Before Liquid-Repelling Treatment | | Less Than 10 | 2 | 6H |
| After Liquid-Repelling Treatment [ ] is liquid-repellent solution No. | [1] | 112 | 2 | 6H |
| | [2] | 112 | 2 | 6H |
| | [3] | 118 | 2 | 6H |
| | [4] | 118 | 2 | 6H |
| | [5] | 99 | 2 | 6H |
| | [6] | 100 | 2 | 6H |
| | [7] | 99 | 2 | 6H |
| | [8] | 100 | 2 | 6H |
| | [9] | 105 | 2 | 6H |
| | [10] | 107 | 2 | 6H |
| | [11] | 105 | 2 | 6H |
| | [12] | 107 | 2 | 6H |
| | [13] | 105 | 10° or more | H |

Front plates prepared in Example 3 were used in the liquid-repelling treatment.

The water contact angle before the liquid-repelling treatment, the refractive indexes, reflectances, and pencil hardnesses before and after the liquid-repelling treatment are also described.

Before the liquid-repelling treatment, all anti-reflecting films exhibited a water contact angle of 10° or less. After the liquid-repelling treatment, however, all anti-reflecting films exhibited an increased water contact angle. Since there was no variation in refractive index and reflectance between before and after the liquid-repelling treatment, it was confirmed that the liquid-repelling treatment does not degrade performances associated with the refractive index and reflectance.

In the case, in which the liquid-repelling treatment was performed using the 0.1% solution of Cytop CTX-109A, the surface resistance of the front plate was increased. It is considered that this is because, although Cytop CTX-109A is substantially completely coated over the surface of the anti-reflecting membrane, the liquid-repellent fluorine-based chain in each of Compounds 1 to 12 is bound in places to the surface of the anti-reflecting membrane via the alkoxy silane group, that is, because each of Compounds 1 to 12 is incompletely coated on the surface of the anti-reflecting membrane. When an increase in membrane resistance occurs, the membrane can be easily electrified. In this case, there is a problem in that waste or dust may easily be attached to the membrane. In this regard, Compounds 1 to 12, which do not cause an increase in membrane resistance, are preferable in that they maintain the membrane in a state making it difficult for waste or dust to be attached to the membrane.

Thus, the fluorine-based compound having an alkoxy silane group at a terminal thereof was confirmed to be is suitable in that it does not incur an increase in membrane resistance in spite of the provision of liquid repellency.

Next, as to the pencil hardness of the anti-reflecting membrane, all the membranes respectively subjected to a liquid-repelling treatment using Compounds 1 to 12 exhibited a pencil hardness of 7H. However, the membrane treated with Cytop CTX-109A exhibited a pencil hardness of H. Since the pencil hardness before the liquid-repelling treatment was 6H, it was also apparent that an improvement in wear resistance was achieved in accordance with the liquid-repelling treatment using Compounds 1 to 12.

After comparison of the compounds used in the liquid-repelling treatment, it can be seen that the cases using Compounds 1 to 4 exhibit a high contact angle. Although a minimum contact angle was exhibited in the case treated using Compound 1 or 2, it was 110°. In particular, a higher contact angle was exhibited in the cases using Compounds 3 and 4. In both cases, the contact angle was 115°. Compounds 1 to 4 have a perfluoropolyether chain. The remaining compounds have a perfluoroalkyl chain or a fluoroalkyl chain. Accordingly, it could be seen that it is possible to form a front plate having excellent liquid repellency when the liquid-repelling treatment is carried out using a compound having a perfluoropolyether chain.

What is claimed is:

1. A liquid crystal device comprising a backlight unit, a backlight unit-side polarizing plate, and a liquid crystal cell held by two glass plates, the liquid crystal cell including an electrode, a liquid crystal layer, an alignment layer, and
   a color filter arranged between the glass plates, the liquid crystal display further comprising:
   a transparent front plate arranged at a side of the liquid crystal cell opposite to the backlight unit, the transparent front plate including an anti-reflecting membrane;
   a polarizing plate attached to the liquid crystal cell; and
   a transparent organic medium layer having a thickness of 0.1 mm to 10 mm arranged between the front plate and the liquid crystal cell,
   wherein the backlight unit, the liquid crystal cell, the polarizing plate, the transparent organic medium layer, and the front plate are held by a frame,
   wherein said transparent organic medium layer comprises a liquid.

2. A liquid crystal device comprising a backlight unit, a backlight unit-side polarizing plate, and a liquid crystal cell held by two glass plates, the liquid crystal cell including an electrode, a liquid crystal layer, an alignment layer, and
   a color filter arranged between the glass plates, the liquid crystal display further comprising:
   a transparent front plate arranged at a side of the liquid crystal cell opposite to the backlight unit, the transparent front plate including an anti-reflecting membrane;
   a polarizing plate attached to the liquid crystal cell; and
   a transparent organic medium layer having a thickness of 0.1 mm to 10 mm arranged between the front plate and the liquid crystal cell,
   wherein the backlight unit, the liquid crystal cell, the polarizing plate, the transparent organic medium layer, and the front plate are held by a frame,
   wherein said transparent organic medium layer has a substantially constant thickness, and includes transparent layer thickness control particles arranged to provide said transparent organic medium layer with said substantially constant thickness.

3. A liquid crystal display comprising a backlight unit, a backlight unit-side polarizing plate, and a liquid crystal cell held by two glass plates, the liquid crystal cell having including an electrode, a liquid crystal layer, an alignment layer, and
   a color filter arranged between the glass plates, the liquid crystal display further comprising:
   a transparent front plate arranged at a side of the liquid crystal cell opposite to the backlight unit, the transparent front plate having including an anti-reflecting membrane;

a polarizing plate attached to the liquid crystal cell; and
a transparent organic medium layer having a thickness of 0.1 mm to 10 mm arranged between the front plate and the liquid crystal cell,
wherein the backlight unit, the liquid crystal cell, the polarizing plate, the transparent organic medium layer, and the front plate are held by a frame, and,
wherein said transparent organic medium layer has a substantially constant thickness,
wherein said transparent organic medium layer comprises a liquid.

4. The liquid crystal display according to claim 3,
wherein said transparent organic medium layer includes transparent layer thickness control particles arranged to provide said transparent organic medium layer with said substantially constant thickness.

\* \* \* \* \*